US007151717B2

(12) United States Patent
Sugiyama

(10) Patent No.: US 7,151,717 B2
(45) Date of Patent: Dec. 19, 2006

(54) RECORDING MEDIUM TRANSPORT DEVICE AND IMAGE FORMING APPARATUS

(75) Inventor: Wataru Sugiyama, Hazu-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 266 days.

(21) Appl. No.: 10/879,219

(22) Filed: Jun. 30, 2004

(65) Prior Publication Data

US 2004/0263599 A1 Dec. 30, 2004

(30) Foreign Application Priority Data

Jun. 30, 2003 (JP) ............................. 2003-187818

(51) Int. Cl.
*G11B 7/085* (2006.01)

(52) U.S. Cl. ............................... 369/30.07; 369/30.36; 720/602; 720/619; 347/104; 347/101

(58) Field of Classification Search ............. 369/30.07, 369/30.36; 347/104, 101; 720/619, 602
See application file for complete search history.

(56) References Cited

U.S. PATENT DOCUMENTS

| | | | | |
|---|---|---|---|---|
| 5,181,433 | A | 1/1993 | Ueno et al. | |
| 6,652,091 | B1 * | 11/2003 | Tanno | 347/104 |
| 6,963,519 | B1 * | 11/2005 | Otsuki et al. | 369/30.36 |

FOREIGN PATENT DOCUMENTS

| | | |
|---|---|---|
| JP | A 38-23604 | 11/1963 |
| JP | A 7-83314 | 3/1995 |
| JP | B2 2710861 | 10/1997 |
| JP | A 2002-154701 | 5/2002 |

* cited by examiner

*Primary Examiner*—Tuan T. Nguyen
*Assistant Examiner*—Pho M. Luu
(74) *Attorney, Agent, or Firm*—Oliff & Berridge, PLC.

(57) ABSTRACT

A recording medium transport device has: a pair of transport roller units which nip and transport a recording medium and which are disposed at an upstream side and a downstream side of a recording area respectively, the transport roller unit in the upstream side including a drive shaft and an upstream side transmission gear attached to the drive shaft, the transport roller unit in the downstream side including a drive shaft and a downstream side transmission gear attached to the drive shaft; an output shaft; and a drive pinion gear attached to the output shaft and engaging with both the transmission gears. Each of the upstream side transmission gear, downstream side transmission gear and the drive pinion gear is a gear in which two spur gears are integrally formed while phases of the two spur gears are shifted from each other by a half pitch.

10 Claims, 17 Drawing Sheets

RECORDING MEDIUM TRANSPORT DEVICE AND IMAGE FORMING APPARATUS

BACKGROUND OF THE INVENTION

1. Field of the Invention

The present invention relates to a recording medium transport device that nips and transports a recording medium, and an image forming apparatus including the recording medium transport device and a printing part.

2. Background Art

Conventionally, in an apparatus for forming an image by causing ink jetted from a nozzle of an ink-jet recording head to adhere to a recording medium, the recording medium is made to intermittently move (step feeding) a specified length in a sub-scanning direction, and during the stop of the intermittent movement, a carriage on which the recording head is mounted is moved in a main scanning direction, and an image is formed in every specified area.

In that case, in JP-A-2002-154701, an upstream side transport roller pair at a transport upstream side (hereinafter simply referred to as an upstream side) in a sheet transport direction and a downstream side transport roller pair at a transport downstream side (hereinafter simply referred to as a downstream side) are disposed at both sides of the recording head, the recording medium is nipped by both the roller pairs, and both the roller pairs are intermittently driven through a multistage gear train from one drive motor (transport motor) so that the recording medium is moved in the sub-scanning direction.

According to the structure of JP-A-2002-154701, since the gear train is constructed in multi-stages, there has been a problem that a large space is required to dispose the large and small gears. Besides, as one of methods for actuating (operating) gears quietly, there is known a method of increasing contact ratio, however, a normal spur gear cannot raise the contact ratio. As another method of increasing the contact ratio, there is a method of using helical gears, however, there arises a problem that a drive load occurs in a thrust direction.

In order to actuate (operate) a gear quietly, for example, Japanese Patent No. 2710861 discloses such a gear that plural (for example, two trains) gear trains (spur gear trains) having the same circumferential pitch are formed on the peripheral surface of a single gear substrate by integral molding, each of the gear trains is shifted from the adjacent gear train by a half pitch (½ pitch), and part of a dedendum of each gear tooth of each gear train is integrated with part of dedendum portions of front and back gear teeth of the adjacent gear train through uniform crossing surfaces.

SUMMARY OF THE INVENTION

However, since the structure of the gear disclosed in Japanese Patent No. 2710861 is complicated as compared with a normal spur gear, there have been problems that its manufacture requires much time, and when it is applied to the sheet transport apparatus as disclosed in JP-A-2002-154701 as it is, the cost is increased.

A recording medium transport device and an image forming apparatus using the same are disclosed herein, in which although a gear as disclosed in Japanese Patent No. 2710861 is used, by a transmission gear mechanism including few gear trains and having a simple structure, both upstream side and downstream side transport rollers can be rotation-driven certainly and quietly for a long period of time.

Besides, in the structure of the gear of Japanese Patent No. 2710861, since part of the dedendum of each gear tooth of each gear train is integrated (coupled) with part of the dedendum portions of the front and back gear teeth of the adjacent gear train through the uniform crossing surfaces, when what is disclosed in Japanese Patent No. 2710861 is adopted as a gear to be engaged, there is a problem that when one of the gears is moved along a direction (gear tooth width direction) of the rotation axial line, the mating gear train interferes with the adjacent gear train, and an abnormal noise occurs.

For example, in the above sheet transport apparatus, in the case where two pinion gears each composed of two gear trains of Japanese Patent No. 2710861 are fixed to an output shaft of one drive motor to be adjacent to each other in the axial line direction and in series, power is transmitted by engagement from the one of the pinion gears to an upstream side large diameter driven gear composed of two gear trains of Japanese Patent No. 2710861, and power is transmitted by engagement from the other of the pinion gears to a downstream side large diameter driven gear composed of two trains of Japanese Patent No. 2710861, when the output shaft of the drive motor, or the shaft of the upstream side driven gear or the downstream side driven gear is moved in the axial line direction (gear tooth width direction), the mating gear train interferes with the adjacent gear train, and on the contrary, a large abnormal noise occurs, and in the worst case, there is possibility that the gear teeth are broken.

In order to solve the disadvantage as stated above, it is necessary to perform the assembly so that the output shaft or the shaft of the upstream side driven gear or the downstream side driven gear does not move in the axial line direction (gear tooth width direction), and there has been a problem that the assembly operation of the transport device requires much time, and the manufacture cost is largely increased.

A recording medium transport device and an image forming apparatus using the same are disclosed herein, which is naturally driven quietly and in which the assembly of a transmission gear mechanism can also be easily performed.

According to one aspect of the invention, a recording medium transport device includes: a pair of transport roller units which nip and transport a recording medium and which are disposed at an upstream side and a downstream side of a recording area respectively, the transport roller unit in the upstream side including a drive shaft and an upstream side transmission gear attached to the drive shaft, the transport roller unit in the downstream side including a drive shaft and a downstream side transmission gear attached to the drive shaft; an output shaft; and a drive pinion gear attached to the output shaft and engaging with both the transmission gears; wherein each of the upstream side transmission gear, downstream side transmission gear and the drive pinion gear is a gear in which two spur gears are integrally formed while phases of the two spur gears are shifted from each other by a half pitch.

BRIEF DESCRIPTION OF THE DRAWINGS

The present invention may be more readily described with reference to the accompanying drawings.

DETAILED DESCRIPTION OF THE PREFERRED EMBODIMENTS

A preferred embodiment of the present invention will be described with reference to FIGS. 1 to 17. The embodiment of the invention is applied to a recording medium transport device 3 to a printing part using an ink-jet recording head 2 in a multi function apparatus having a facsimile function, a scanner function, a copying function and a printer function.

Figure 1:
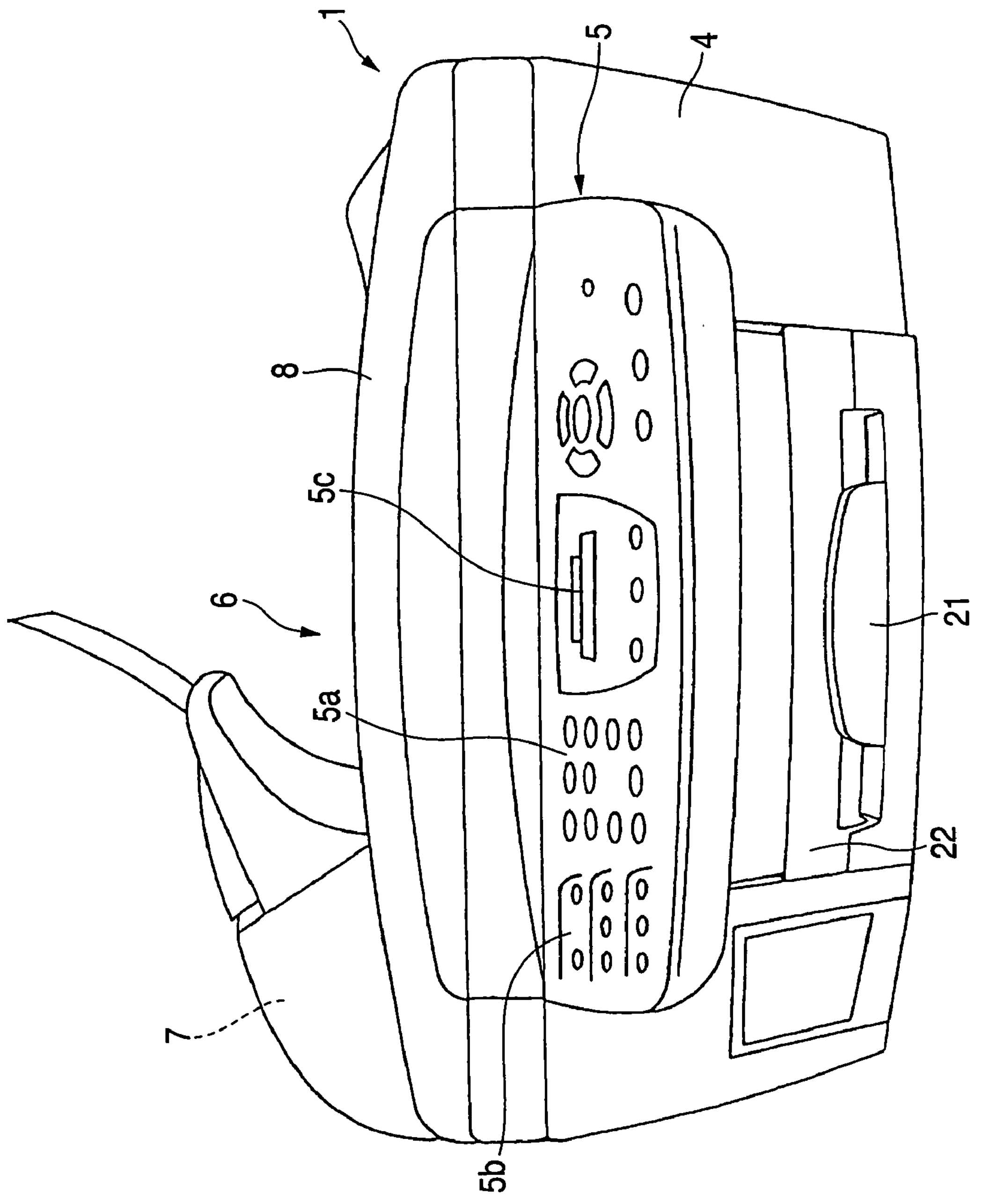
FIG. 1 is an overall front view of a multifunction apparatus.

As shown in FIG. 1, a front part of an upper surface in a main body case 4 of the multifunction apparatus 1 is provided with an operation panel part 5 including a ten-key pad 5*a* for executing the facsimile function, the scanner function and the copying function, a button key 5*b* for instructing various operations, a liquid crystal panel 5*c* and the like.

A document read device 6 provided on the main body case 4 made of a resin and having an automatic paper feed device 7 includes a cover body 8 vertically rotatably mounted to a rear edge of the main body case 4 through a hinge (not shown), the automatic paper feed device 7 provided at one side of the upper surface of the cover body 8, a read element, such as a not-shown CIS (Contact Image Sensor), positioned at the lower side of an end glass plate (not shown) fixed to one end of the upper surface of the main body case 4, and the like. Incidentally, in this embodiment, in addition to the automatic paper feed reading performed in a state where the read element is stopped at the lower side of the automatic paper feed device 7 while a document is moved, such a structure is also adopted that a document is put on a large glass plate (not shown) disposed on the upper surface of the main body 4 while a surface on which an image is formed is oriented downward, and in a state where the document is pressed by a press body (not shown) such as a sponge provided at the under surface of the cover body 8, the read element reads the image according to image read instructions while moving on a guide rail disposed along the under surface of the large glass plate.

Figure 2:
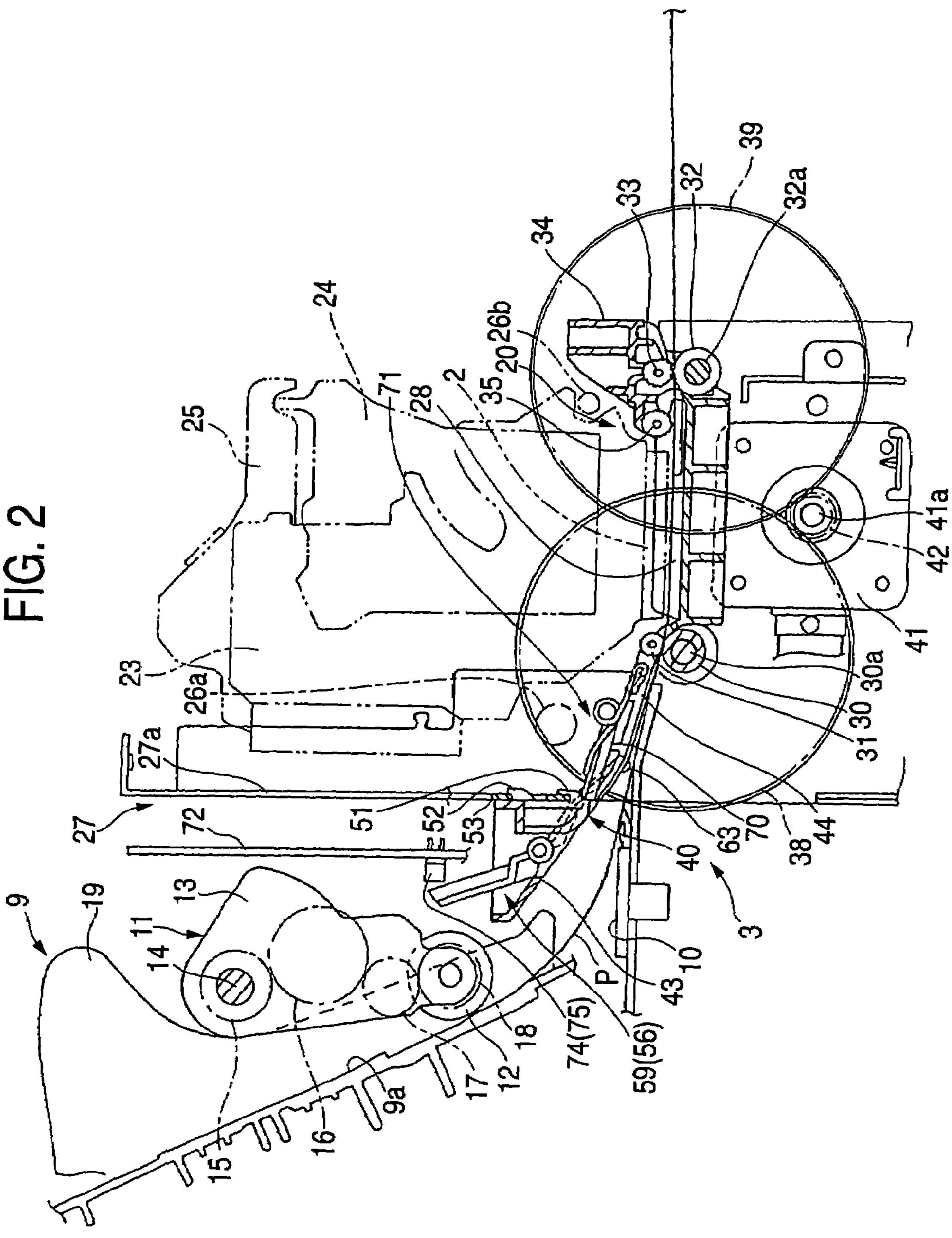
FIG. 2 is a side view of an ink-jet printing part and a recording medium transport device.

A paper feed part 9 is provided at the rear side of the main body case 4 and behind the cover body 8. As shown in FIG. 2, a paper feed tray 9*a* in the paper feed part 9 is disposed to be slanted downward and forward, and sheets P cut into a predetermined size as an example of recording media set in a stacked state are put on the paper feed tray 9*a* so that their lower end edges come in contact with a separating plate 10. At the surface side (front side) of the paper feed tray 9*a*, a case 13 of a paper feed roller unit 11 including a paper feed roller 12 as a paper feed unit is rotatably mounted to a halfway part of a transmission shaft 14 in a longitudinal direction. In the case 13, there are disposed a drive gear 15 rotated integrally with the transmission shaft 14, a planetary gear 16 supported at the tip of a planetary arm (not shown) rotatably fitted to the transmission shaft 14 and engaging with the drive gear 15, an intermediate gear 17, and a gear 18 rotated integrally with the paper feed roller 12. Besides, although not shown, the case 13 is elastically urged by a torsion spring so that the paper feed roller 12 is pressed to the uppermost surface of the stacked sheets P.

Incidentally, a pair of sheet guide plates 19 (FIG. 2 shows only one of them) for guiding both the right and left side edges of the transported sheet P are mounted to the paper feed tray 9*a* to be horizontally movable in synchronization. Accordingly, in the paper feed tray 9*a*, the sheet P is transported by the recording medium transport device 3 in a state where its center in the width direction is coincident with the center position of an after-mentioned printing part 20 in the horizontal width. Further, at the front surface of the main body case 4, a paper output tray 21 for receiving a recording medium after an image is formed in the printing part 20 protrudes forward from an opening part 22.

Figure 3:
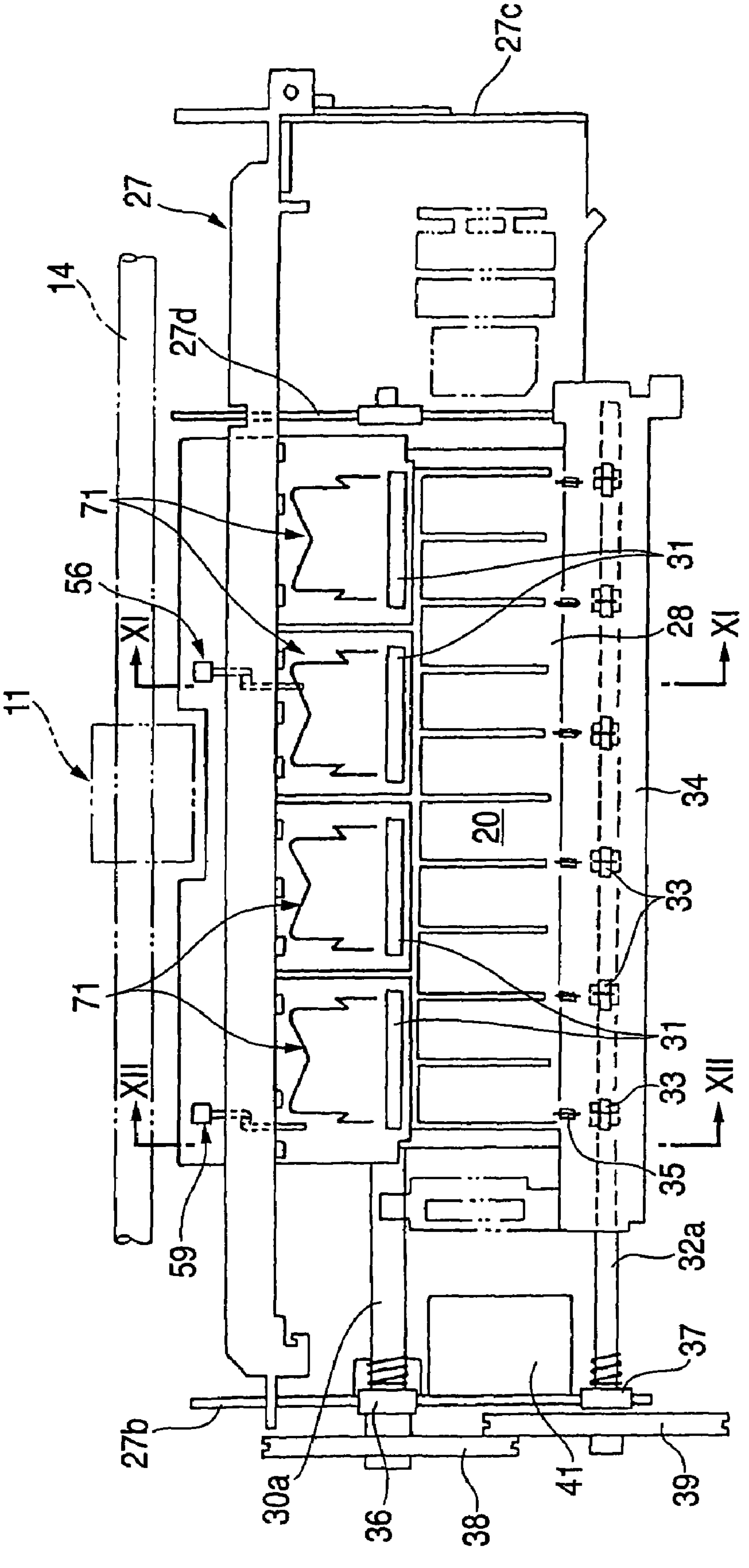
FIG. 3 is a plan view of the recording medium transport device.
Figure 4:
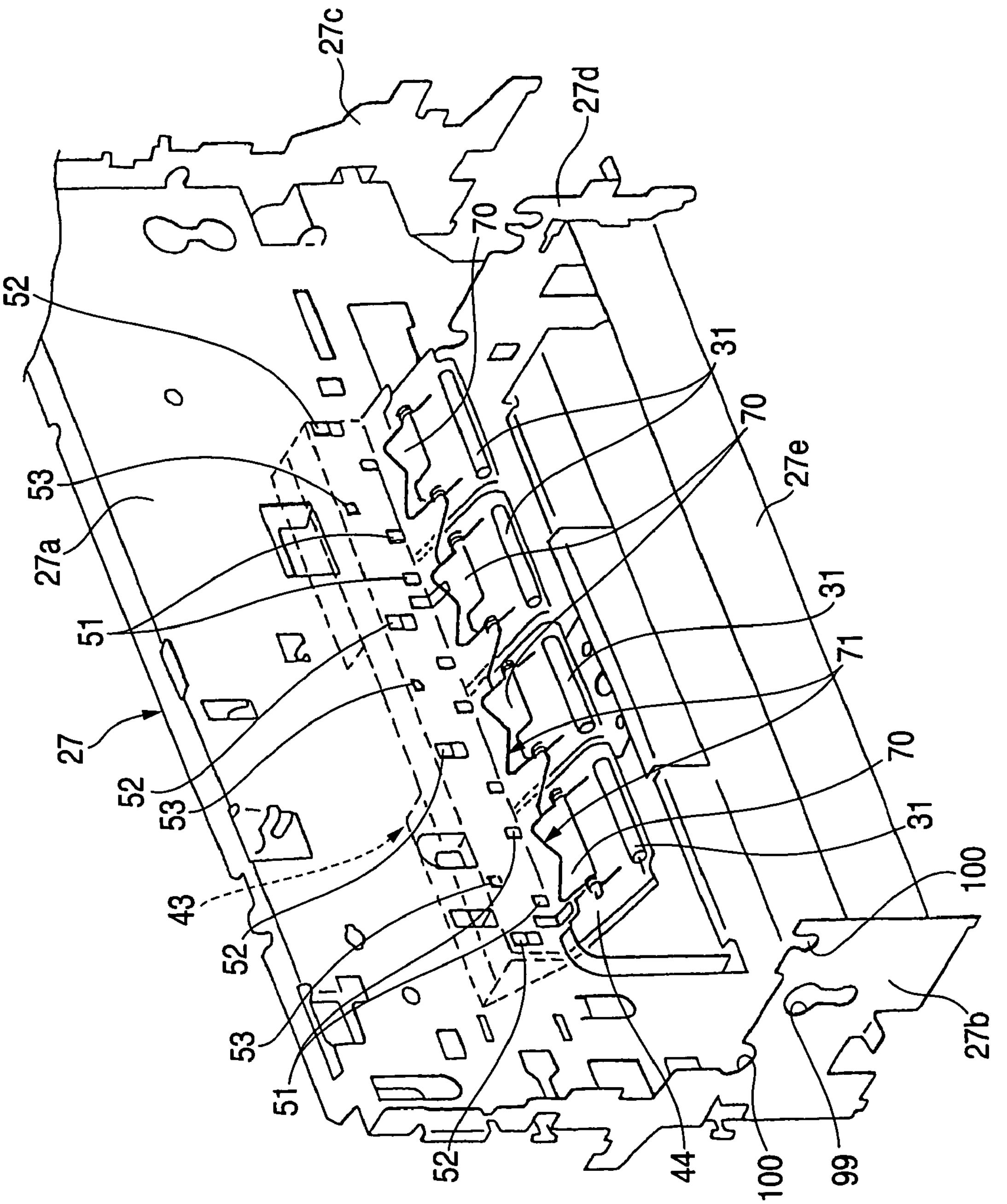
FIG. 4 is a front perspective view of the recording medium transport device in a state where it is mounted to a frame.
Figure 5:
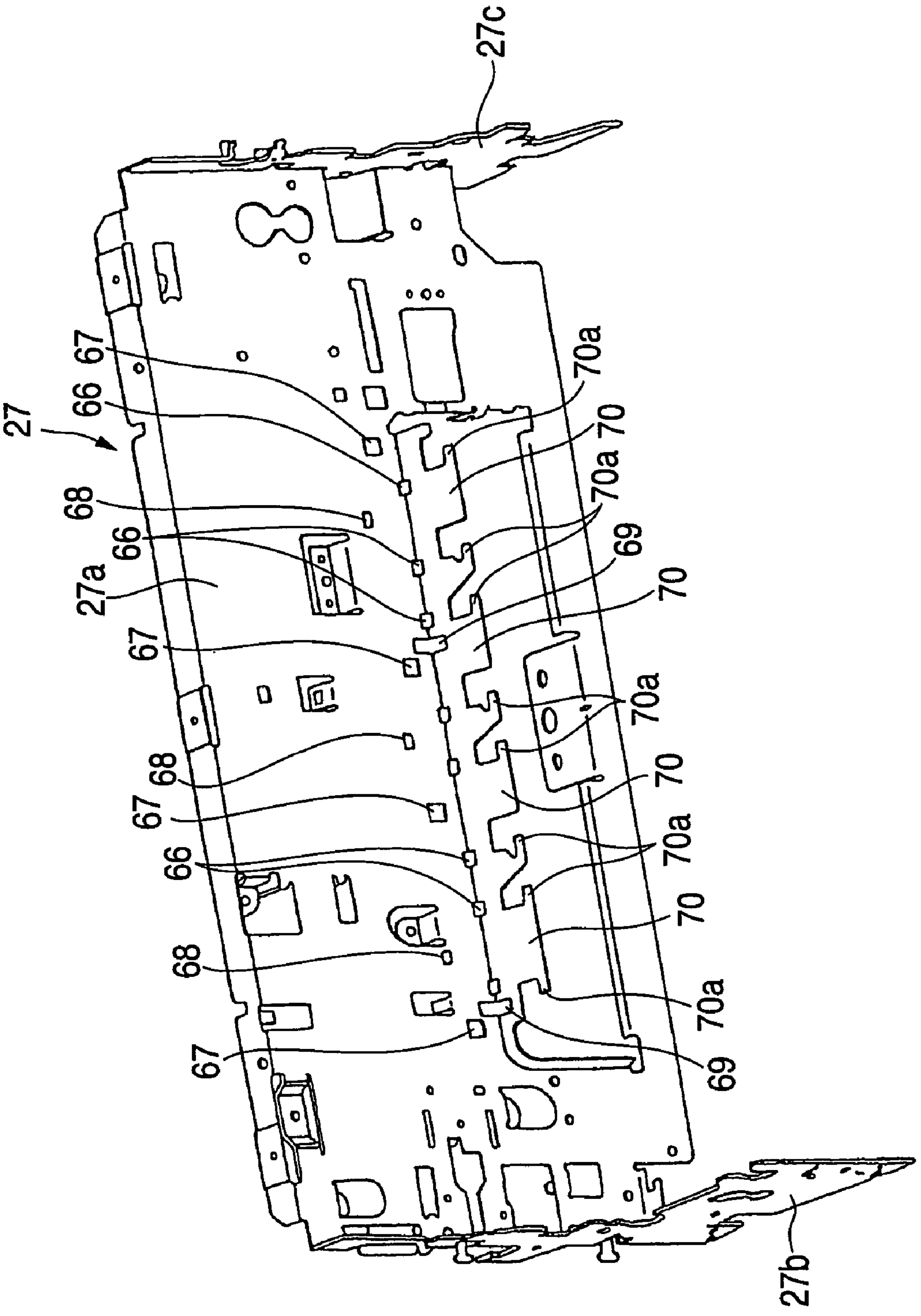
FIG. 5 is a front perspective view of the frame.

FIG. 2 is a side sectional view of the printing part 20 of the ink-jet recording head 2 and the recording medium transport device 3. The paper feed tray 9*a*, the paper feed roller unit 11, and the like are disposed at the transport upstream side of a frame 27 made of a metal plate and formed to be bent into a C shape when viewed on a plane as shown in FIGS. 3 to 5, and the after-mentioned printing part 20 and the recording medium transport device 3 are disposed at the transport downstream side thereof.

The frame 27 includes a main frame part 27*a* long along a width direction (also called a moving direction of a carriage or a main scanning direction, and the same shall apply hereinafter) of the sheet P, a side frame part 27*b* (27*c*) bent from both the right and left ends of the main frame 27*a* toward a transport direction (also called a sub-scanning direction, and the same shall apply hereinafter) of the sheet P and extending toward the downstream side in the transport direction, a side frame part 27*d* protruding, as a separate plate, from a halfway part of the main frame part 27*a* in the horizontal direction toward the downstream side in the transport direction, and a reinforcement part 27*e* for coupling the front end parts of the side frames 27*b* and 27*d* positioned at both the right and left sides (see FIGS. 4 and 5).

A carriage 23 is slidably mounted along two guide shafts 26*a* and 26*b* laid in a horizontal longitudinal direction between the pair of side frames 27*b* (27*d*). The recording head 2 of the color ink-jet cartridge type is mounted in the carriage 23 while its nozzle surface is oriented downward. Besides, ink cartridges 24 in which inks of respective colors of cyan, yellow, magenta and black are stored are detachably mounted on the upper surface of the recording head 2. Incidentally, the ink cartridge of each color is pressed downward and can be fixed by a lever 25 vertically rotatably provided at an upper end of the carriage 23.

The carriage 23 coupled with an endless timing belt (not shown) provided in parallel to the guide shaft 26*a* is constructed such that the carriage 23 can be reciprocated in the main scanning direction by the operation of a carriage motor (not shown) for driving the timing belt.

A platen 28 is disposed below the carriage 23 to face a nozzle surface of the recording head 2 and to extend in the main scanning direction.

Next, a structure of the recording medium transport device 3 will be described. In order to nip and intermittently transport the sheet P as the recording medium fed one by one from the paper feed roller 12 provided in the paper feed part 9 and the separating plate 10, the recording medium transport device 3 includes an upstream side transport roller pair 30, 31 as a first transport roller pair and a downstream side transport roller pair 32, 33 as a second transport roller pair. The upstream side roller pair 30, 31 are disposed at the upstream side of the platen 28, and the downstream side transport roller pair 32, 33 are disposed at the downstream side thereof.

Figure 14A:
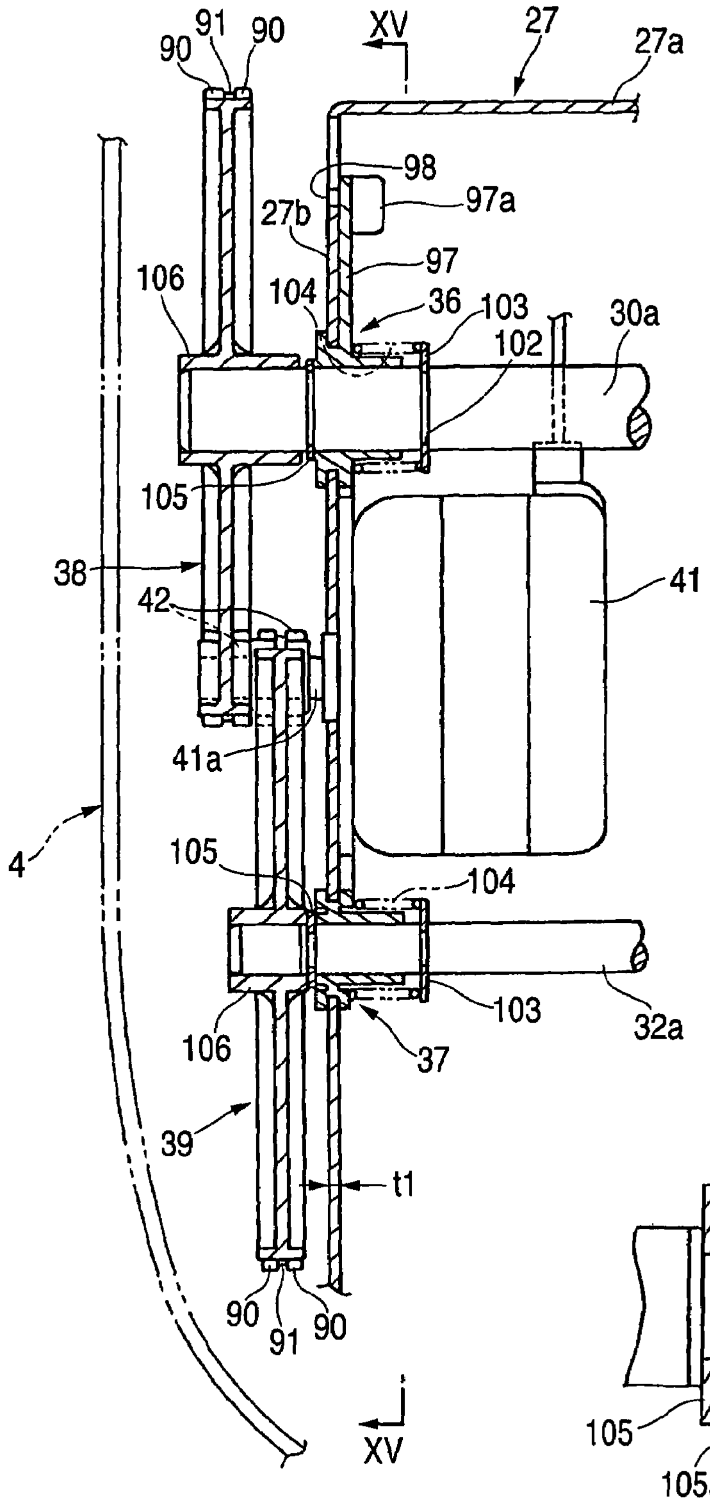
FIG. 14A is a main part enlarged sectional view at places of transmission gears and bearing bodies.

Each of the drive roller 30 disposed at the lower side in the upstream side transport roller pair, and the drive roller 32 disposed at the lower side in the downstream side transport roller pair is one roller elongating in the main scanning direction. The outer periphery of each of drive shafts 30*a* and 32*a* of round rods made of metal is coated with a material having a large friction coefficient such as rubber. Both end parts (only one is shown in FIGS. 3, 14, and 15) of each of the drive shafts 30*a* and 32*a* are supported by the pair of side frame parts 27*b* (27*d*) through bearing bodies 36 and 37 made of synthetic resin. Then, a transmission gear 38 fixed to one end of the drive shaft 30*a* of the upstream side drive roller 30 and a transmission gear 39 fixed to one end of the drive shaft 32*a* of the downstream side drive roller 32 are constructed such that they rotate in the same direction in synchronization with each other through two pinion gears 42 attached in series to a motor shaft 41*a* as an output shaft of a transport motor 41 (see FIGS. 2 and 3).

The above structure will be described in more detail. In the frame 27, the transport motor 41 is fixed to the inside of the left side frame part 27*b* in FIG. 3, and the motor shaft 41*a* of the transport motor 41 protrudes in the left outward direction. This transport motor 41 uses, for example, a hybrid stepping motor, and according to the transport motor 41 of this type, since it rotates in a state where the motor shaft 41*a* is urged in the direction of protruding from a main body, there is a merit that the motor shaft 41*a* does not fluctuate in the axial direction, but rotates in the state where it is regulated to a constant position.

On the other hand, each of the pinion gears 42, the upstream side transmission gear 38 and the downstream side transmission gear 39, which are made of synthetic resin such as POM (polyacetal resin), is constructed of a gear in which two spur gears 90 and 90 are shifted from each other by a half pitch, and are integrally molded to include an annular groove part 91 between the two spur gears 90 and 90, which has a suitable width size (about 1 mm in the embodiment) and includes a junction surface of the two spur gears (see FIGS. 14A, 14B, 17A and 17B).

That is, the annular groove part is formed between the two spur gears 90 and 90, which are connected to each other while their phases are shifted from each other by the half pitch, so as to have such a shape as to include the junction surface of the two spur gears 90 and 90, and desirably, the annular groove part is formed by, for example, cutting (removing) a portion within a range from a part (between a dedendum part and a pitch circle) slightly smaller than the radius of the pitch circle to an addendum part. The two spur gears 90 and 90 are integrally molded of synthetic resin material to include the annular groove part 91 having the specified width while the junction surface of the two spur gears 90 and 90 is made the center. By this, the annular groove part 91 is constructed such that the dedendum portion from the dedendum parts of the two spur gears to the pitch circle (more correctly, the part slightly smaller than the radius of the pitch circle) remains, and a radius Ro of the outer peripheral surface of the annular groove part 91 from a rotation center axial line of the gear is set to be slightly smaller than a radius of the pitch circle of each of the spur gears 90. Besides, a groove width size B1 of the annular groove part 91 is substantially half of a gear tooth width size Bo of each of the spur gears 90, and in the embodiment, the gear tooth width size Bo is 1.75 mm to 1.875 mm, and the groove width size B1 is about 1 mm to 1.2 mm (see FIGS. 17A and 17B)

As stated above, when the annular groove part 91 having the diameter slightly smaller than the diameter of the pitch circle of the spur gear is formed while the dedendum portion remains, even if the upstream side transmission gear 38 or the downstream side transmission gear 39 is shifted by the substantially half distance (B1/2) of the groove width size B1 in the direction of the drive shaft 30*a*, 32*a*, an engagement phenomenon to the place of the spur gear 90 shifted by the half pitch does not occur, and an abnormal noise does not occur.

Besides, since the shift as stated above is relative, even when each of the pinion gears 42 is shifted in the drive shaft direction with respect to the upstream side transmission gear 38 and the downstream side transmission gear 39, the engaging phenomenon to the place of the spur gear 90 shifted by the half pitch does not occur, and an abnormal noise does not occur. In other words, when the groove width size B1 of the annular groove part 91 is set in view of a previously estimated error of manufacture and assembly, even if some errors occur within the estimated range, the occurrence of the abnormal noise can be certainly prevented.

Further, the annular groove part 91 does not include such a structure that the whole of the tooth form from the addendum part to the dedendum part is cut, and the dedendum portion up to almost the pitch circle remains, and therefore, there are effects that the engagement of the gear teeth can be kept by that, and the strength of the gear teeth is not largely reduced.

Figure 16A:
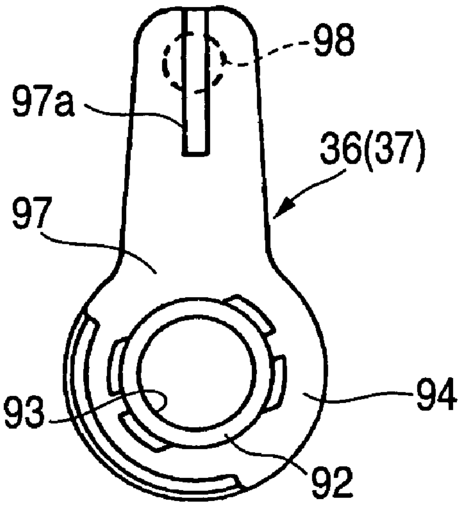
FIG. 16A is a side view of a bearing body.
Figure 16B:
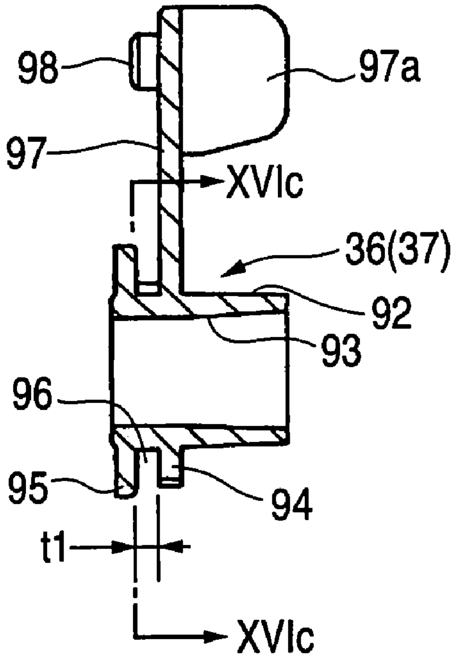
FIG. 16B is sectional view.
Figure 16C:
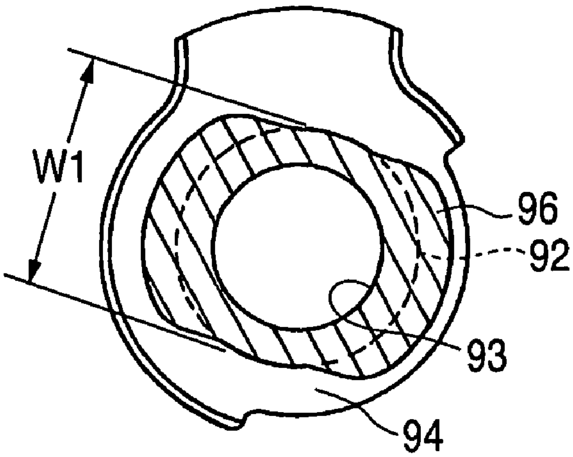
FIG. 16C is an enlarged sectional view taken along XVI—XVI of FIG. 16B.
Figure 17A:
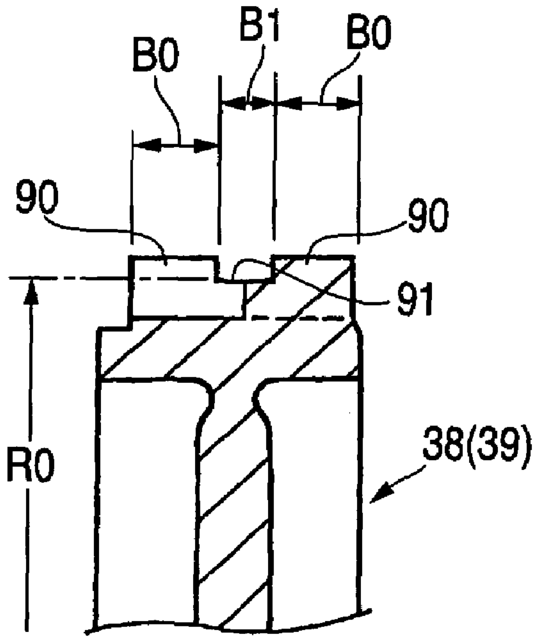
FIG. 17A is a partial enlarged sectional view of a transmission gear.
Figure 17B:
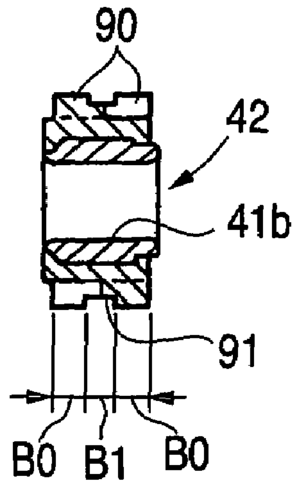
FIG. 17B is a sectional view of a pinion gear.

When the drive shaft 30*a* of the upstream side transmission gear 38 and the drive shaft 32*a* of the downstream side transmission gear 39 are pivotally supported by the left side frame part 27*b*, bearing bodies 36 and 37 made of synthetic resin such as POM (polyacetal resin) shown in FIGS. 16A to 16C are used. An inner diameter hole (bearing hole) 93 of a boss part (tube part) 92 in the bearing body 36 (37) is formed to have a diameter equal to the diameter of the drive shaft 30*a* (32*a*), and the bearing body 36 (37) and the drive shaft 30*a* (32*a*) are relatively rotatable and are moveable in the axial line direction. pair of flange parts 94 and 95 are integrally molded on the outer peripheral surface of the boss part (tube part) 92 to be spaced from each other by an interval equal to a plate thickness t1 of the side frame part 27*b*. A fitting groove 96 having a noncircular cross section in which a part of the circumference remains like a place indicated by hatching of FIG. 16C is integrally molded between the pair of flange parts 94 and 95 and on the outer peripheral surface of the boss part (tube part) 92.

With respect to a lever part 97 integrally extending from a part of the one flange part 94 in the direction orthogonal to the axial line of the inner diameter hole (bearing hole) 93, a knob part 97*a* is integrally molded on its one surface and an engagement projection 98 is integrally molded on a surface opposite to the knob part 97*a* (see FIG. 16A and 16B).

As shown in FIG. 15, a potbelly-shaped (form in which a large and a small holes standing in a line communicate with each other) insertion hole 99 in which the two pinion gears fixed to the motor shaft 41*a* of the transport motor 41 can be inserted, is provided in the left side frame part 27*b*. Besides, a large diameter hole part 100 in which the fitting groove 96 of the bearing body 36 (37) can be fitted to be rotatable around an axial line is provided in the left side frame part 27*b* and at a place where each of the transmission gears 38 and 39 is tobe disposed, and further, there is formed an insertion groove 101 communicating with apart (upper side) of the large diameter hole part 100 and communicating with an upper end face of the side frame part 27*b* to be opened.

Then, a width size W2 of the insertion groove 101 is formed such that with respect to the fitting groove 96 in which at least the part of the circumferential surface remains in the bearing body 36 (37), only an area of a small diameter part having a small width size W1 can pass through.

Next, an assembling operation of the power transmission system will be described. As shown in FIG. 14A, first, an E-ring (E-shaped retaining ring) 103 is fitted to a positioning annular groove 102 at a left part of the drive shaft 30*a* (32*a*). Next, an urging coil spring 104 formed of a compression coil spring and the bearing body 36 (37) are fitted along the axial line from the left end of the drive shaft 30*a* (32*a*). In that case, each of lever parts 97 is set at the side along the inner surface of the left side frame part 27*b*. Next, an E-ring (E-shaped retaining ring) 105 to be made to face the end face of the boss part 92 of the bearing body 36 (37) is fitted to an annular groove of the drive shaft 30*a* (32*a*). Further, the transmission gear 38 (39) is press fitted from the left end of this drive shaft 30*a* (32*a*), and is positioned and fixed at a position where an end face of a boss part 106 of the transmission gear 38 (39) coincides with the left end face of the drive shaft 30*a* (32*a*).

Next, as shown by a solid line portion of FIG. 15, the lever part 97 is held between fingers and the bearing body 36 (37) is rotated around the drive shaft 30*a* (32*a*) to cause such a phase that the small diameter part having the width W1 in the fitting groove 96 of the bearing body 36 (37) passes through the insertion groove 101 having the width size W2, and in that state, each of the fitting grooves 96 is inserted into the insertion groove 101 from the upper end face side of the side frame part 27*b*, and the lever part 97 is rotated-along the inner surface of the side frame part 27*b*, so that the circumstantial part of each of the fitting grooves 96 is fitted to the large diameter part 100 at the place of the large diameter part 100. At this time, the engagement projection 98 comes in slide contact with the inner surface of side frame part 27*b* by elasticity of the lever part 97. Next, as indicated by a two-dot chain line of FIG. 15, when the engagement projection 98 on the opposite surface of each of the lever parts 97 is engaged with an engagement hole 106, 107 bored in the side frame part 27*b*, it becomes impossible for each of the fitting grooves 96 to come off in the direction of the insertion groove 101 of the side frame part 27*b*, and the rotation posture of the bearing body 36 (37) is kept.

Then, in this state, as a result that the drive shaft 30*a* (32*a*) is urged toward the right direction of FIG. 14 through the urging coil spring 104, the transmission gear 38 (39) fixed to the left end of the drive shaft 30*a* (32*a*) is set at a position where it is pulled to the outer surface of the left side frame part 27*b* and is not shifted in the axial direction. This transmission gear 38 (39) and the two trains of pinion gears 42 fixed to the motor shaft 41*a* protruding outward (leftward) are engaged through the respective parallel spur gears 90 and 90 and are not shifted in the axial direction, and therefore, quiet power transmission can be realized.

Figure 14B:
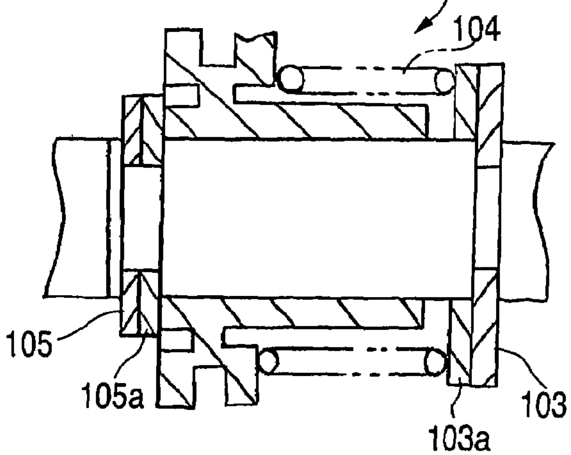
FIG. 14B is a partial enlarged view of FIG. 14A.
Figure 15:
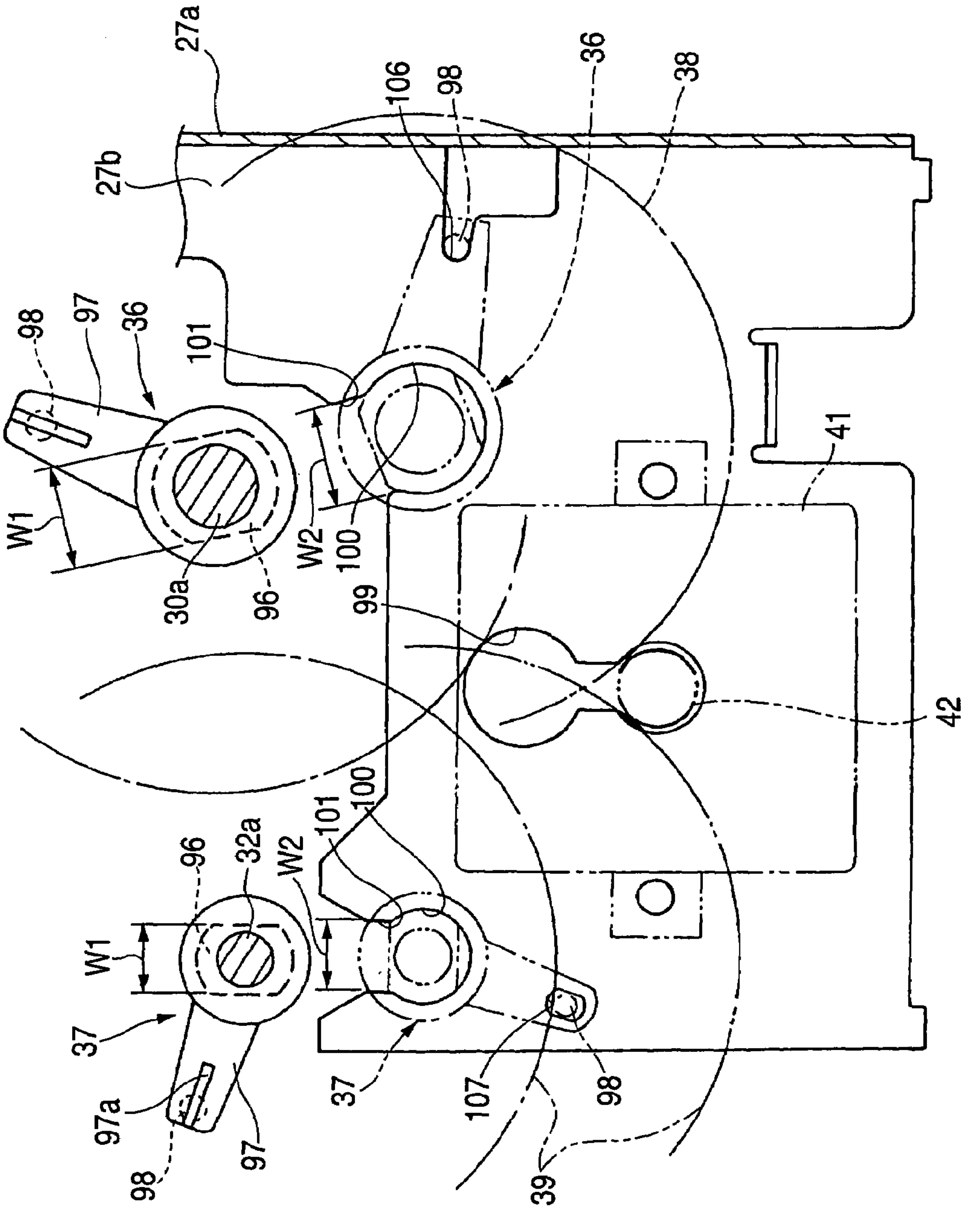
FIG. 15 is a view taken along line XV—XV of FIG. 14.
Figure 18:
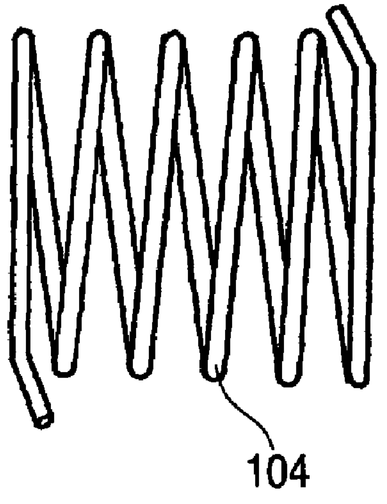
FIG. 18 is a plan view of an urging coil spring.

Incidentally, as shown in FIG. 14B, it is preferable to make a washer 103*a*, 105*a* intervene between the E-ring (E-shaped retaining ring) 103 fitted to the positioning annular groove 102 and the urging coil spring 104, and between the bearing body 36 (37) and the E ring (E-shaped retaining ring) 105 positioned at the left thereof, and preferably, it is desirable that a washer made of a material having a small friction load (friction coefficient) is made to intervene. Besides, at an end of the urging coil spring 104 at least at the side where it comes in contact with the bearing body 36 (37), as a processing (processing for reducing a friction load) for preventing frictional resistance against the bearing body 36 (37) from increasing, it is desirable that the tip end of a spring line material is bent toward the inside coil portion (see FIG. 18), and more preferably, such processing is applied to both end parts of the urging coil spring 104, so that there is obtained an effect that at the time of attachment of the urging coil spring 104, it may be mounted in either direction. Incidentally, each of the pinion gears 42 is attached in such a manner that a bushing 41*b* (see FIG. 17B) in which the two spur gears 90 and 90 are integrally molded (outsert molding) at the outer peripheral part is press fitted to the motor shaft 41*a*. However, it is not necessary to always use the motor shaft 41*a*, and for example, the attachment may be made to an output shaft to which the rotation of the motor shaft 41*a* is transmitted after being reduced.

The pinch rollers 31 as driven rollers disposed at the upper side in the upstream side transport roller pair are disposed at suitable intervals in the main scanning direction on the upper surface of the drive roller 30. Each of the pinch rollers 31 is attached to an after-mentioned pinch roller holder body 40 as a support unit for supporting and capable of independently urging it.

On the other hand, on a sheet guide 34 disposed at the downstream side of the platen 28 and a tan upper part and elongated in the main scanning direction, spur-type driven rollers 33 as shown in FIG. 2 are disposed at predetermined intervals in the main scanning direction. A mode may be such that the spur-type driven rollers 33 are individually urged by elastic springs and are pressed to the drive roller 32. Besides, on the sheet guide 34, plural auxiliary spurs 35 are disposed at the upstream side of the driven rollers 33 in the main scanning direction at suitable intervals (see FIGS. 2 and 3). The recorded sheet P smoothly passes through the lower surface side of the sheet guide 34 by the auxiliary spurs 35 and is guided toward positions between the spur-type driven rollers 33 and the drive roller 32.

Figure 6:
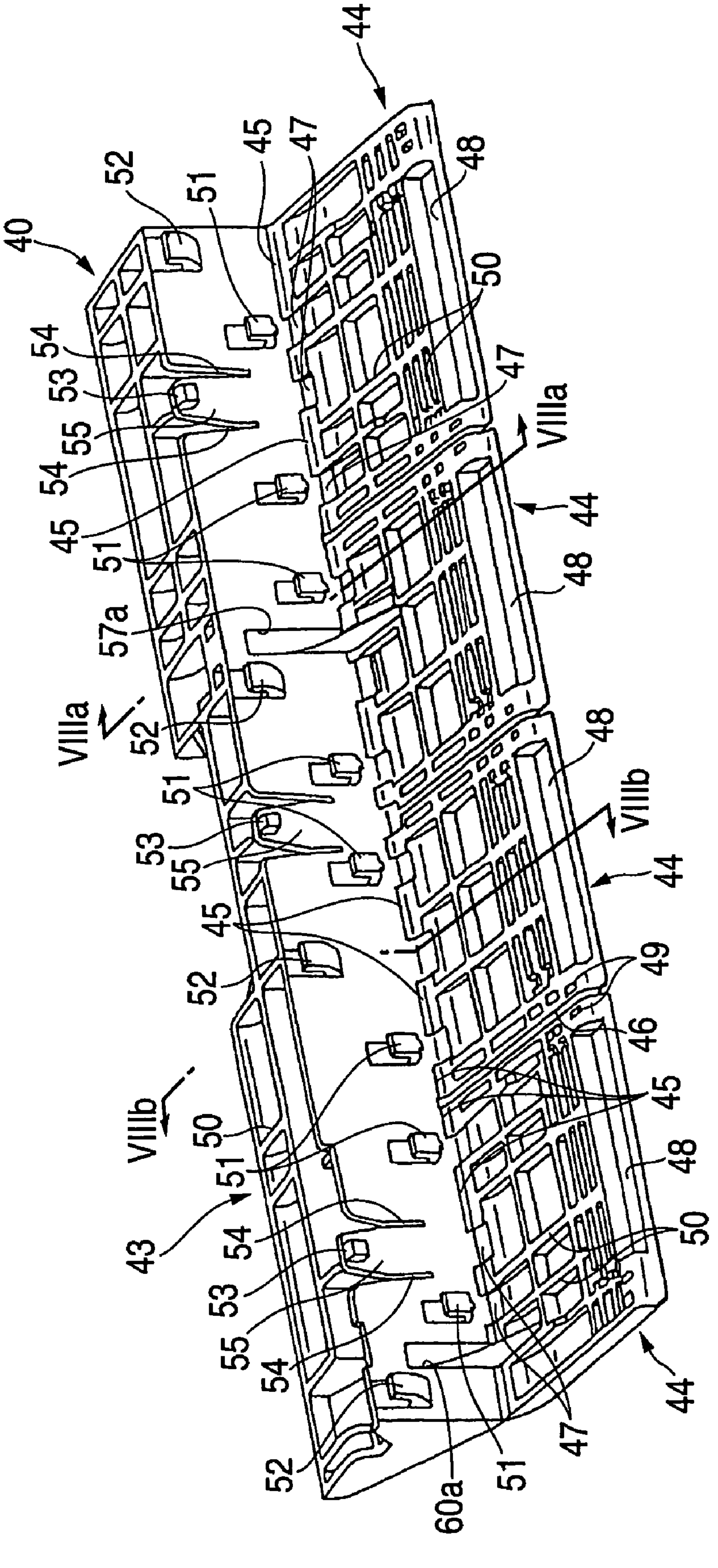
FIG. 6 is a perspective view of a pinch roller holder body.
Figure 7:
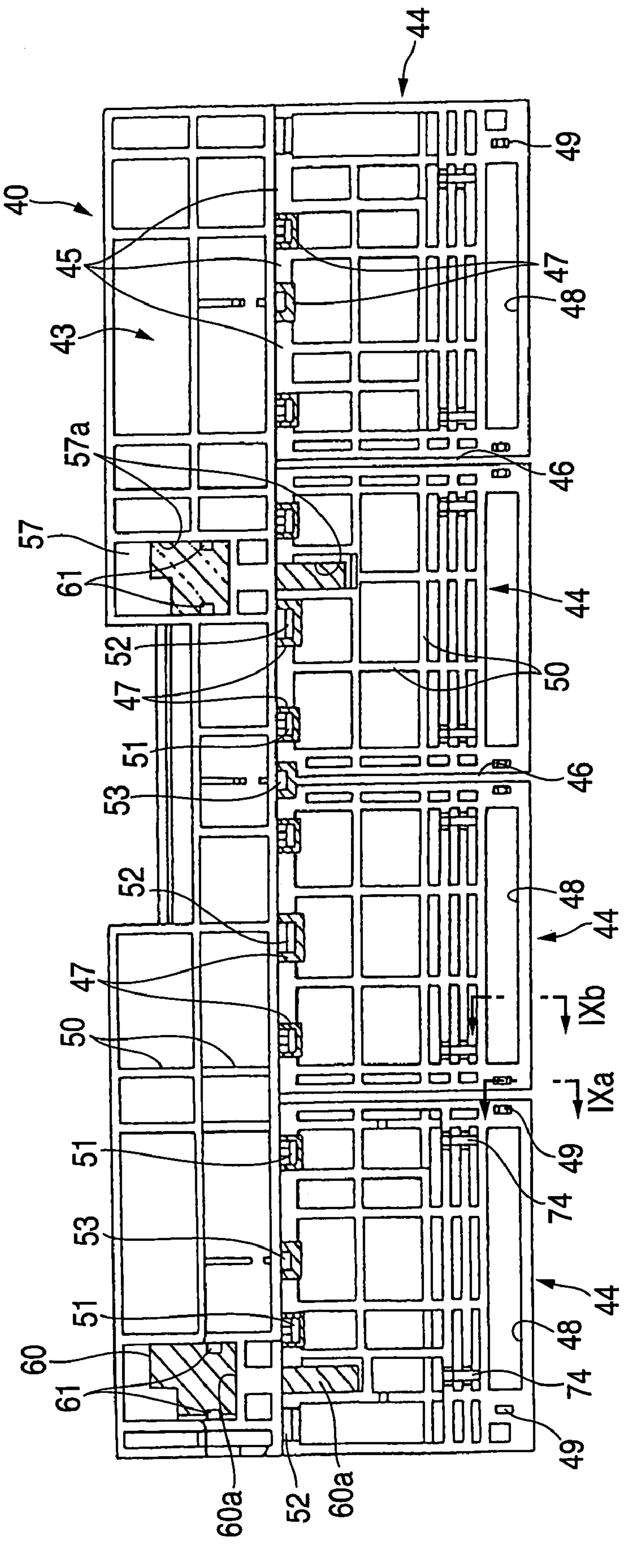
FIG. 7 is a plan view of the pinch roller holder body.
Figure 8A:
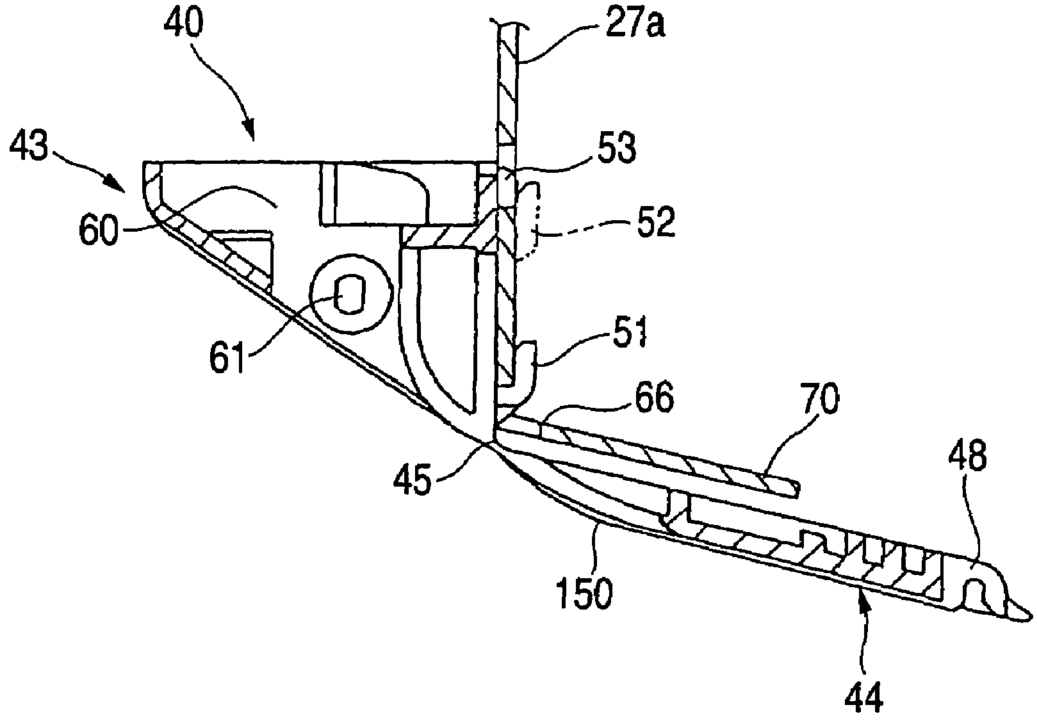
FIG. 8A is a sectional view taken along line VIIIa—VIIIa of FIG. 6.
Figure 8B:
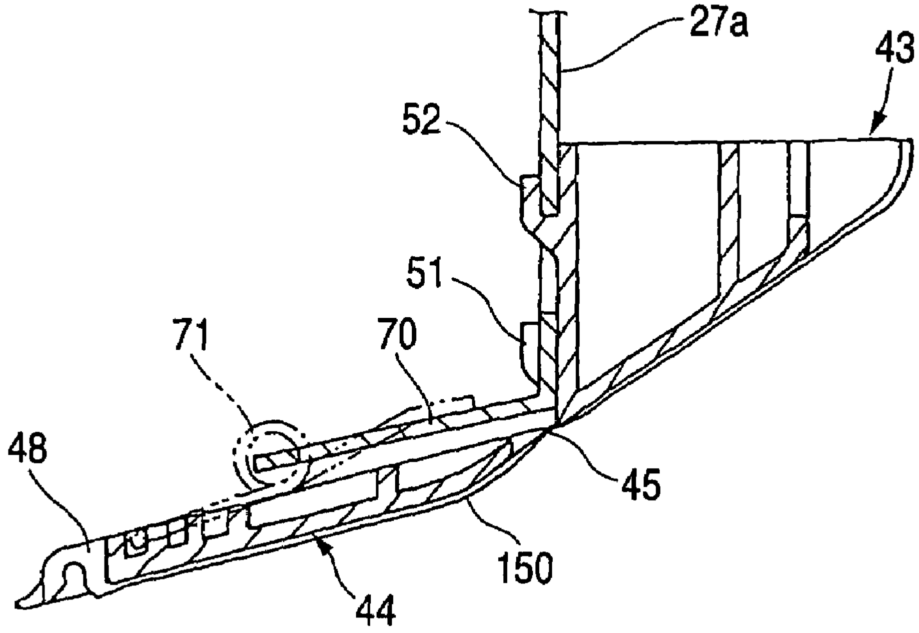
FIG. 8B is a sectional view taken along line VIIIb—VIIIb of FIG. 6.
Figure 9A:
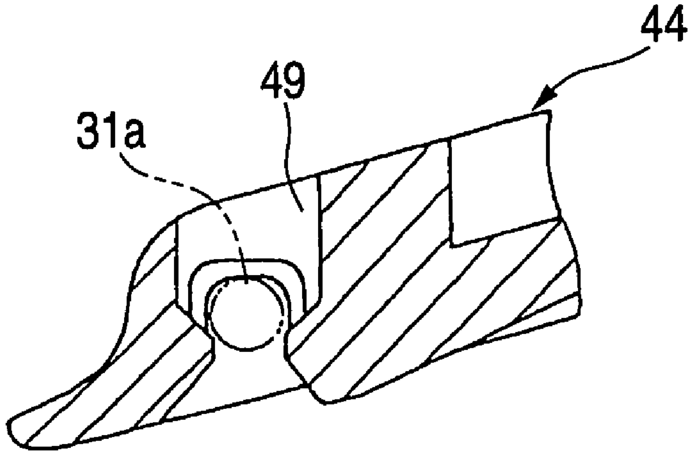
FIG. 9A is an enlarged sectional view taken along line IXa—IXa of FIG. 7.
Figure 9B:
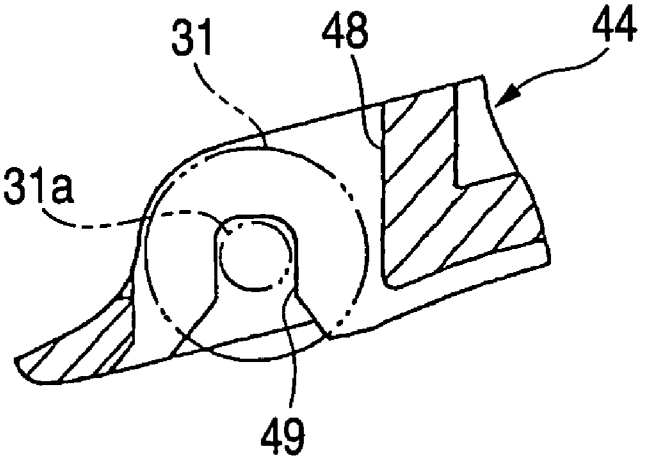
FIG. 9B is an enlarged sectional view taken along line IXb—IXb of FIG. 7.

The pinch roller holder body 40 made of synthetic resin such as POM (polyacetal resin) is such that a base part 43 elongated in the main scanning direction and respective support parts 44 for supporting the respective pinch rollers 31 are integrally molded by injection molding, and the respective support parts 44 are integrally connected to the one base part 43 by thin coupling parts 45 long in the width direction (main scanning direction) of the sheet P (see FIGS. 6 to 8). Further, in addition, in order that the pinch rollers 31 are disposed at symmetrical positions with respect to the center line of the sheet P in the width direction (main scanning direction), the respective support parts 44 are separated by slits 46 extending toward the downstream side in the sheet transport direction. Then, plural through holes 47 (see hatching parts in FIG. 7) are bored among the long thin coupling parts 45 as the root parts between the base part 43 and the respective support parts 44. By the thin coupling parts 45, the respective support parts 44 are constructed to be easily bent elastically and vertically with respect to the base part 43. Besides, by the existence of the through holes 47, the length of the thin coupling part 45 can be made shorter than the width size of each of the support parts 44, and the bending action can be improved.

Figure 11:
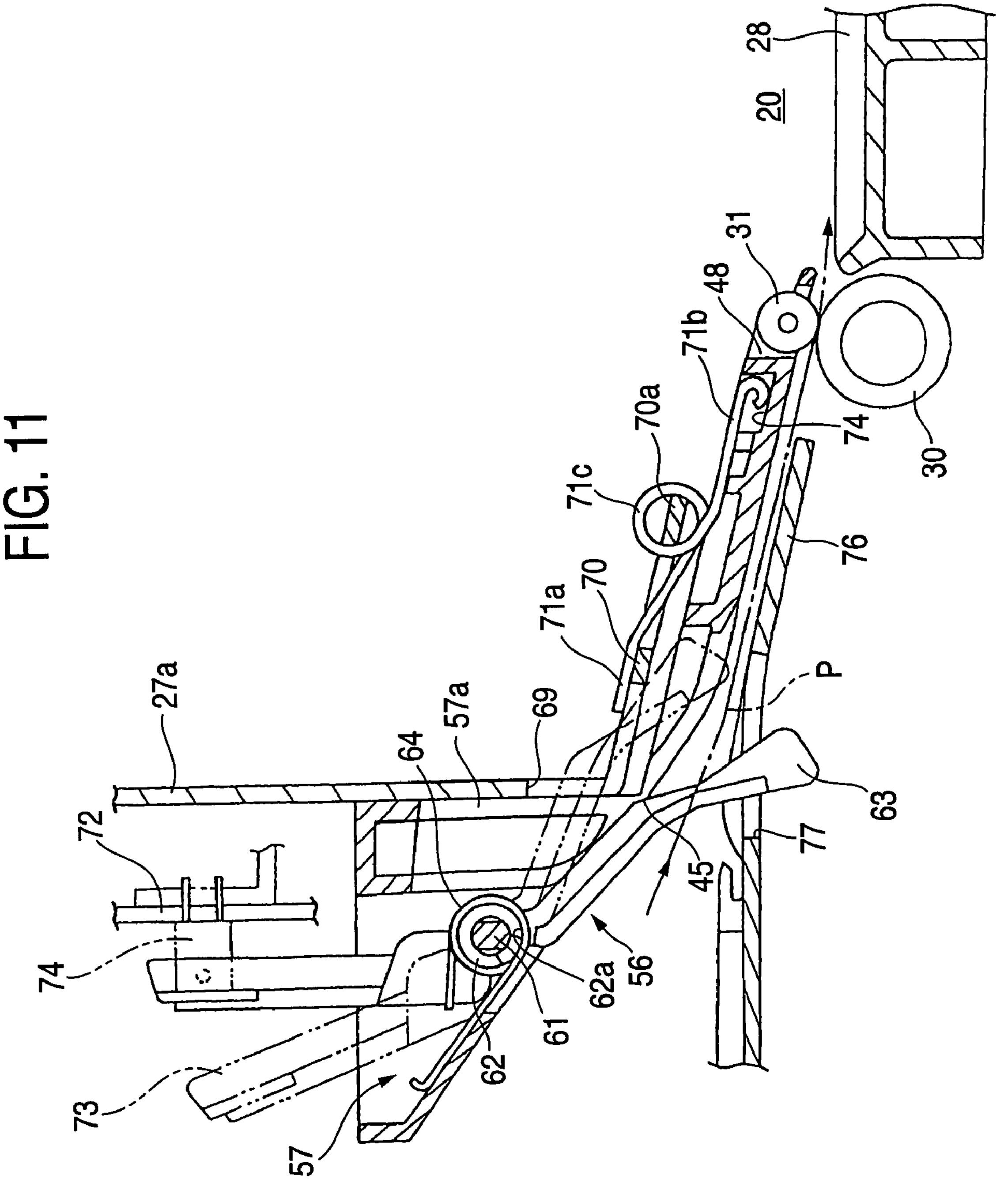
FIG. 11 is an enlarged sectional view taken along line XI—XI of FIG. 3.
Figure 12:
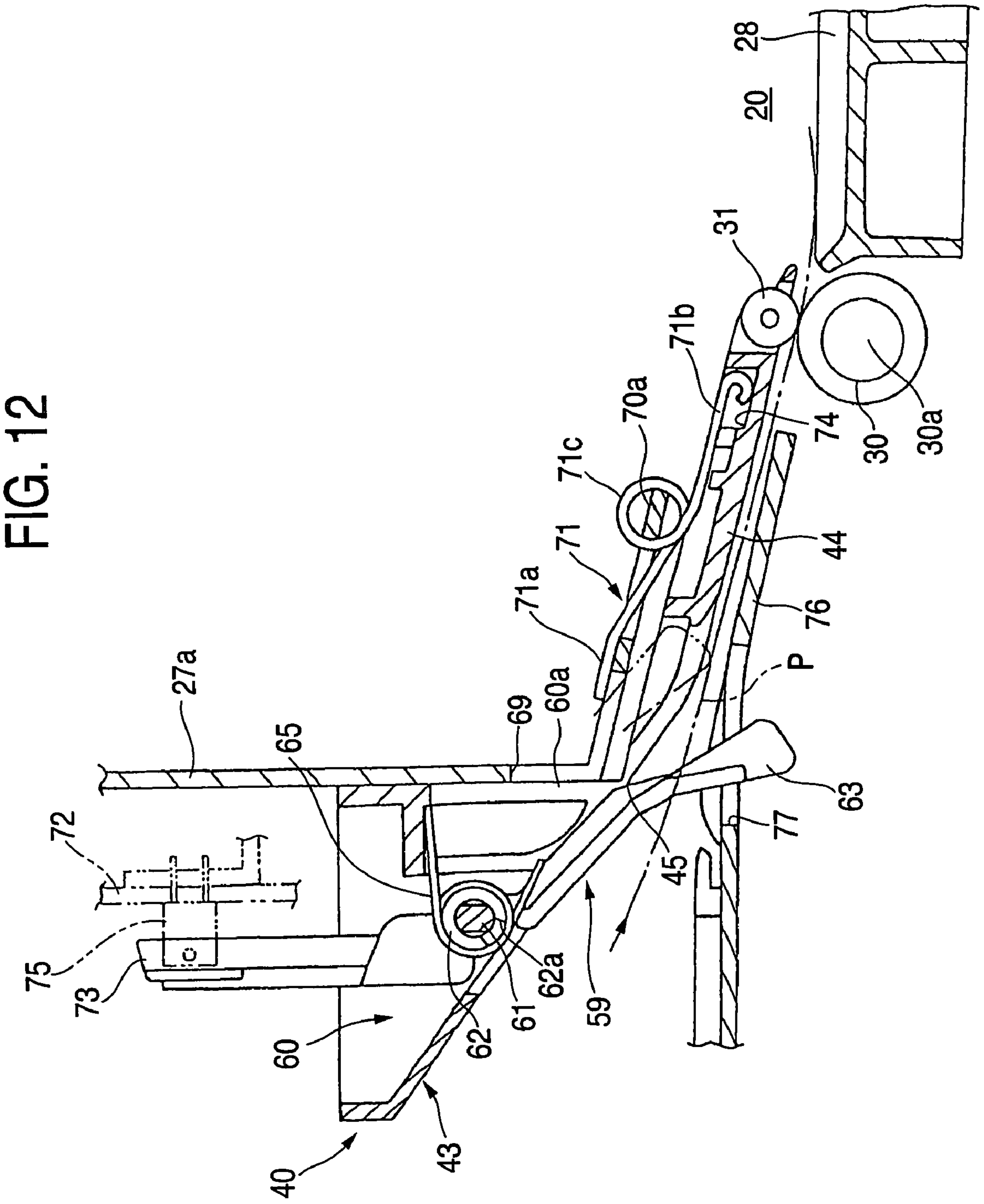
FIG. 12 is an enlarged sectional view taken along line XII—XII of FIG. 3.
Figure 13:
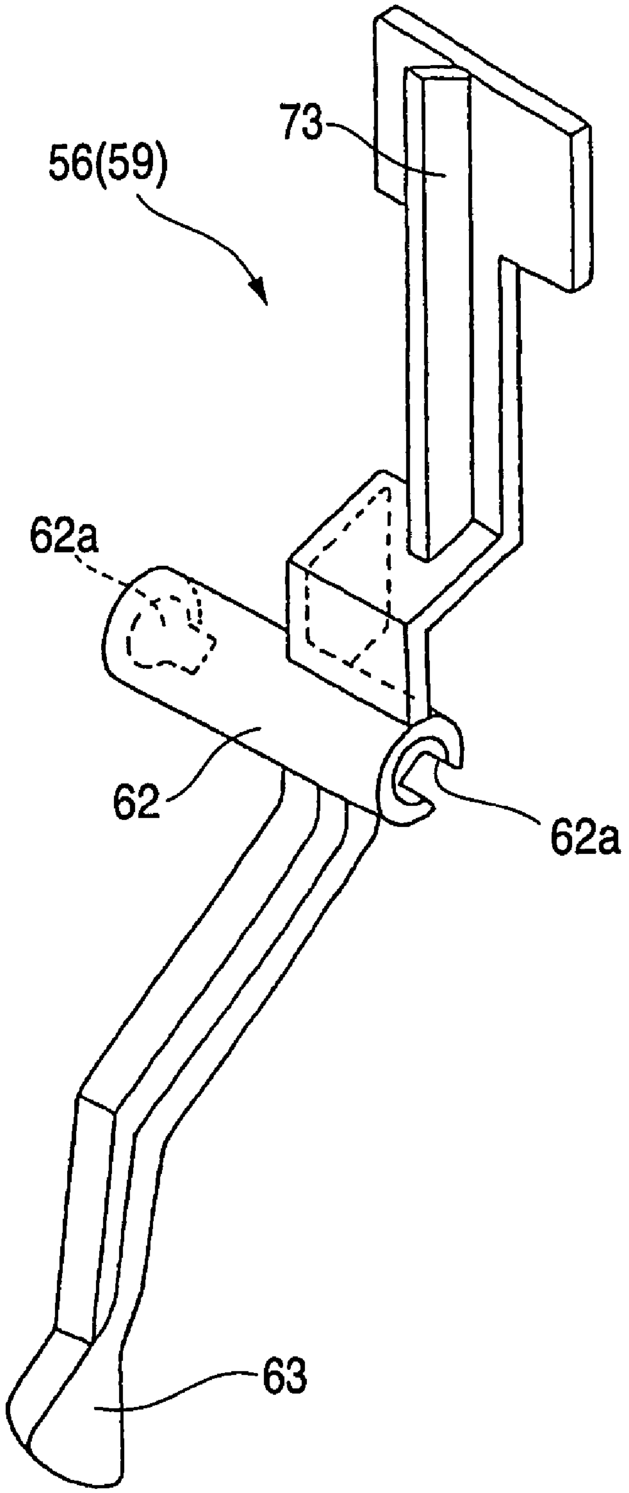
FIG. 13 is a perspective view of a registration detection lever and a width detection lever.

At the tip part (the downstream side) of each of the support parts 44, there are formed a disposition hole 48 in which each of the pinch rollers 31 is inserted from below, and attachment parts 49 which support a support shaft 31*a* protruding from both ends of each of the pinch rollers 31 in such a manner that the support shaft can not fall off and is rotatable (see FIGS. 6, 7, 9 and 10). The base part 43 is basically formed to be a box having an open top or a frame, and the respective support parts 44 are basically formed to be flat plates. Further, plural (many) ribs 50 are integrally formed horizontally and vertically on the base part 43 and the support parts 44 in order to reduce weight and to raise rigidity. Moreover, at their bottoms, many ribs 150 (see FIG. 8. FIGS. 11 and 12 omit the illustration) extending in the sheet transport direction and for reducing contact resistance to the sheet P are provided at intervals in the width direction of the sheet P.

Then, upward first engagement hook parts 51, second hook parts 52 and substantially rectangular descending stop hooks 53 are integrally formed on the front surface of the base part 43, so that the main frame part 27*a* of the frame 27 can be positioned from the back side to cause inability to fall off and to cause inability to move in the vertical direction and the horizontal direction (see FIGS. 6, 7 and 8).

More particularly (in the embodiment), the two first engagement hook parts 51 (eight in total) are disposed for each of the support parts 44 at the lower part of a front plate 43a of the base part. 43. The second engagement hook parts 52 are disposed at the upper part of the front plate 43*a* of the base part 43 and at four places in total, that is, at places near both the horizontal ends and near the center. The descending stop hook part 53 is integrally formed at the front surface of an elastic piece 55 formed between a pair of-notch grooves 54 having open top in the front plate 43*a* of the base part 43. In the embodiment, the elastic pieces 55 are provided at three places in the horizontal direction of the base part 43 and at suitable intervals (see FIGS. 6 and 7).

Incidentally, in FIG. 7, the respective through holes 47 indicated by hatching correspond to the respective places of the first engagement hook parts 51, the second engagement hook parts 52, and the descending stop hook parts 53, are slightly larger than the shapes of the respective hook parts 51 to 53, and are substantially rectangular when viewed on a plane. The hook parts 51 to 53 and the through holes 47 are disposed as stated above, so that the respective hook parts 51 to 53 are integrally molded by a pair of metal molds at the time of injection molding of the pinch roller holder body 40.

Further, by changing the number, arrangement and the like of the hook parts 51 to 53 and the through holes 47, the strength of the thin coupling part 45 can be changed for each of the support parts 44. By this, even when a common urging spring body 71 is used, each of pressing forces of the pinch rollers 31 in the width direction (main scanning direction) of the sheet P can be suitably changed.

Besides, a shaft support part 57 and an insertion hole 57*a* for mounting a registration detection lever (sheet detection lever) 56, which detects the leading end of the sheet P to be fed and transported and detects that the intermittently transported sheet P comes off from the nipping by the upstream side transport roller pair 30, 31, are formed to extend from the base part 43 of the pinch roller holder body 40 through the thin coupling part 45 to the support part 44 and substantially at the center part in the horizontal direction (center part in the main scanning direction). Then, a shaft support part 60 and an insertion hole 60*a* for mounting a width detection lever 59, which comes in contact with part of the sheet P in the width direction and detects the width of the sheet P, are formed at a position (side part) away from the center part of the base part 43 in the horizontal direction toward one side (see FIGS. 7, 8A, 11 and 12). The insertion holes 57*a* and 60*a* are indicated by hatching in FIG. 7.

In each of the shaft support parts 57 and 60, a pair of noncircular shafts 61 are provided to be opposite to each other so as to have a suitable gap at their free end sides (see FIGS. 7, 8, 11 and 12). On the other hand, an insertion groove 62*a* which can be fitted to the noncircular shafts 61 only when a contact part 63 side (lower end side) of each of the registration detection lever 56 and the width detection lever 59 is inserted to the insertion hole 57*a*, 60*a* in a direction orthogonal to the axial line of the noncircular shaft 61, is formed by cutting in a bearing tube part 62 formed at a halfway part of each of the registration detection lever 56 and the width detection lever 59 (see FIGS. 11, 12 and 13).

As shown in FIGS. 11 and 12, each of urging springs 64 and 65 for applying urging forces to the respective levers 56 and 59 has a winding part fitted to one side of the bearing tube part 62, a first engagement part extending from one side of the winding part is engaged with the registration detection lever 56 or the width detection lever 59, and a second engagement part extending from the other side of the winding part is engaged with the shaft support part 57, 60.

On the other hand, in the main frame part 27*a* of the frame 27, engagement holes 66, 67 and 68 are bored to correspond to the hook parts 51, 52 and 53 in the pinch roller holder body 40 (see FIG. 5). Besides, in the main frame part 27*a*, vertically long holes 69 are bored at positions corresponding to the places of the insertion holes 57*a* and 60*a* (see FIGS. 5, 11 and 12).

Incidentally, the width size of the engagement hole 67 corresponding to one (in this embodiment, the right end in FIGS. 3 to 5) of the plural second engagement hooks 52 is made coincident with the horizontal width of the corresponding second engagement hook part 52, so that as described later, a positioning function is achieved which makes horizontal movement impossible when the pinch roller holder body 40 is attached to the frame 27. Besides, at the lower end side of the main frame part 27*a*, spring support pieces 70 to cover the upper surfaces of the support parts 44 of the pinch roller holder body 40 substantially in parallel are integrally formed in a downward inclined shape toward the transport direction downstream side (see FIG. 5 etc.). Then, the engagement holes 66 corresponding to the first engagement hook parts 51 are formed at coupling root parts between the lower end of the main frame part 27*a* and the spring support pieces 70.

Besides, a vertical distance in the vertical direction from the upper edge of the engagement hole 66 to the lower side of the engagement hole 68 is set to be equal to a vertical distance in the vertical direction from the root part of the first engagement hook part 51 with open top to the lower surface of the descending stop hook part 53.

Incidentally, an urging spring body 71 for pressing the pinch roller 31 at the tip of each of the support parts 44 of the pinch roller holder body 40 toward the circumferential surface of the drive roller 30 is disposed to extend over the spring support piece 70 of the frame 27 and the support part 44, and the urging spring body 71 in the embodiment is formed such that one spring rod is bent and is integrally formed to be substantially M-shaped when viewed on a plane. In that case, one metal spring rod is bent so that the urging spring body 71 includes an M-shaped center part 71*a*, press foot parts 71*b* and 71*b* at both sides, and winding parts 71*c* at halfway parts of the respective press foot parts 71*b*.

Figure 10:
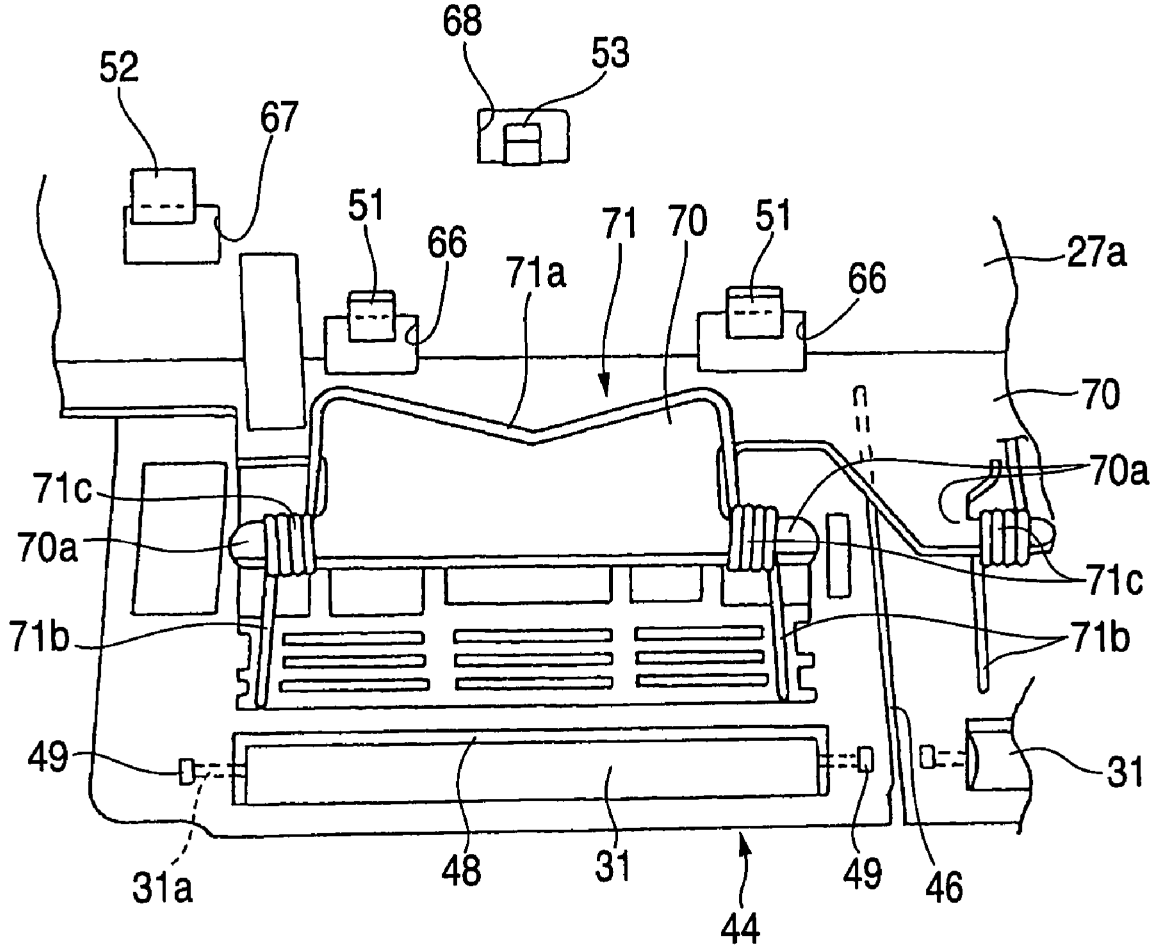
FIG. 10 is an enlarged view of a main part of FIG. 4.

Then, mount projection parts 70*a* to which the respective winding parts 71*c* are fitted in the horizontal direction (width direction of the recording medium) and can be supported are integrally formed at both end parts of each of the spring support pieces 70 at the free end side (see FIGS. 5 and 10). More particularly, as shown in FIGS. 4 and 5, only the mount projection part 70*a* positioned at the leftmost end protrudes in the left direction, and the other mount projection parts 70*a* are formed to protrude in the right direction.

A control substrate 72 is vertically provided at the rear surface side (upstream side in the transport direction) of the main frame part 27*a* in parallel thereto, and a registration sensor 74 and a width sensor 75, such as photo interrupters, for detecting the approach of the detected parts 73 at the upper end sides of the registration detection lever 56 and the width detection lever 59 by the interruption of light are fixed at the rear surface of this control substrate 72.

In a state (state where the rear edge of the sheet P has passed) in which the lower end (contact part 63) of the detection lever 56 (59) is fitted in a hole 77 of an upper surface of the guide plate 76, the base end side (detected part 73) of the detection lever 56 (59) enters the detection part of the registration sensor 74 (width sensor 75) and an OFF signal is outputted (see a solid line state of FIGS. 11 and 12). In a state where the leading edge of the sheet P presses up the contact part 63 of the detection lever 56 (59) and rotates it, the detected part 73 is separated from the registration sensor 74 (width sensor 75) and an ON signal is outputted (see a two-dot chain line state of FIG. 11).

In the above structure, in order to mount the pinch roller holder body 40 to the main frame part 27*a*, the front side of the base part 43 is made to approach upward from the lower end side of the main frame part 27*a*. Then, it is pressed up in a state where the respective lower first engagement hook parts 51 are fitted in the corresponding engagement holes 66, and the second engagement hook parts 52 are fitted in the corresponding engagement holes 67. At that time, since the descending stop hook part 53 protruding forward at the upper side of each of the upward elastic pieces 55 is pressed to the rear surface of the main frame part 27*a*, the upper end side (free end side) of the elastic piece 55 is elastically deformed by the reaction force so that it is separated from the rear surface of the main frame part 27*a*. Then, when the descending stop hook part 53 is fitted in the engagement hole 68, it is fitted to the engagement hole 68 by the elastic force of the elastic piece 55 itself in a state where the lower end of each of the descending stop hook parts 53 is in contact with the lower edge of the engagement hole 68. At that time, the first engagement hook parts 51 respectively come in contact with the upper edges of the engagement holes 66, and the second engagement hook parts 52 respectively come in contact with the upper edges of the engagement holes 67. By this, the base part 43, that is, the pinch roller holder body 40 cannot be moved vertically, and can be mounted to the main frame part 27*a* in the positioned state. Further, at this time, since the one second engagement hook part 52 and the engagement hole 67 are equal to each other in width size in the main scanning direction, the base part 43, that is, the pinch roller holder body 40 can not be moved also in the horizontal direction (main scanning direction), and the horizontal location is also positioned.

As stated above, the plural hook parts 51 to 53 are provided at the front surface of the base part 43, and when the respective hook parts are engaged with the engagement holes 66 to 68 bored in the main frame part 27*a* of the frame 27, there is obtained a merit that the attachment operation of the pinch roller holder body 40 to the frame can be performed through one-touch operation.

In this state, each of the support parts 44 is disposed almost along the lower surface of the spring support piece 70 extending in the oblique down direction (direction to approach the upper surface of the drive roller 30) from the lower end of the main frame part 27*a*, and the pinch roller 31 at the tip of each of the support parts 44 approaches the upper surface of the drive roller 30. Next, the center part 71*a* of each of the urging spring bodies 71 is put on the upper surface of each of the spring support pieces 70, and when the winding parts 71*c* are fitted to the mount projection parts 70*a* of each of the spring support pieces 70, the press foot parts 71 at both the sides of the urging spring body 71 are disposed on the upper surface of the support part 44 so as to extend toward the tip direction. Then, a round part of the tip (free end) of the press foot part 71*b* is fitted in an engagement recess part 74 (see FIGS. 7, 11 and 12) concavely formed in the upper surface of each of the support parts 44 and at the side part near the tip.

Thus, each of the support parts 44 is coupled with the base part 43 through the thin coupling part 45, and each of the urging spring bodies 71 applies the urging force, so that the pinch roller 31 at the tip side of each of the support parts 44 is independently pressed and urged to the upper surface of the drive roller 30.

Besides, with respect to each of the urging spring bodies 71, the tip round part of the press foot part 71*b* is first fitted in the engagement recess part 74, and then, the winding part 71*c* may be fitted to the mount projection part 70*a*. For example, the respective right and left tip round parts may be fitted at the same time, or while the tip round part at one of the right and left sides is fitted in the engagement recess part 74, the winding part 71*c* is fitted to the mount projection part 70*a*, and then, the center part (M-shaped portion) 71*a* mounted on the upper surface of the spring support piece 70 is operated to push it open toward the outside or inside against the elasticity, and while the winding part 71*c* at the other side is fitted to the mount projection part 70*a*, the tip round part may be fitted in the engagement recess 74.

At this time, with respect to each of the urging spring bodies 71, since the center part 71*a* coupling the pair of left and right press foot parts 71*a* is formed to be bent like the M shape, when the winding parts 71*c* are fitted to the mount projection parts 70*a*, the push opening operation toward the fitted direction becomes very easy.

Accordingly, especially in the embodiment shown in FIGS. 4 and 5, since only the leftmost mount projection part 70*a* is formed to protrude toward the left direction, at the time of mounting of the urging spring body 71 corresponding to this, it is necessary that the press foot part 71*a* is operated to be press opened outward, and the winding part 71*c* is fitted to the mount projection part 70*a*, however, there is no fear that the attachment operation becomes difficult by this.

When the leftmost mount projection part 70*a* is also made to protrude toward the right direction, a projection piece for the formation of a mount projection part is newly required at the outside (left side) of the left end spring support piece 70 shown in FIG. 5, and by that, a large opening (space corresponding to a transport path of the recording medium) must be formed in the frame, and accordingly, there is a fear that the strength of the frame is lowered. However, in this embodiment, there is no such fear.

Incidentally, the registration detection lever 56 and the width detection lever 59 are mounted at a pre-stage in which the pinch roller holder body 40 is mounted to the frame 27.

That is, in the state (see FIGS. 11 and 12) of mounting to the pinch roller holder body 40, the contact part 63 of each of the detection levers 56 and 59 comes in contact with part of the spring support piece 70, and further rotation is restricted, and therefore, the bearing tube part 62 can not rotate up to the position (position where the insertion groove 62*a* corresponds to the thin width portion of the noncircular shaft 61) where it can be separated from the noncircular shaft 61. By this, sudden separation of the respective levers 56 and 59 in the mounting state can be certainly prevented.

However, within a normal operation range of the respective levers 56 and 59 in the mount state, that is, within a range where the respective levers 56 and 59 are rotated by the contact with the sheet P, when at least the condition that the insertion groove 62*a* does not correspond to the thin width portion of the noncircular shaft 61 is satisfied, the respective levers 56 and 59 may be attached after the pinch roller holder body 40 is mounted to the frame 27.

Then, when an image formation (printer) instruction is issued by a button operation of the operation panel part 5, one of the sheets P stacked on the paper feed part 7 is fed by the rotation of the paper feed roller 12, and the leading end of the sheet P is separated from the stacked place at the place of the separating plate 10, and is transported to the upstream side transport roller pair 30, 31 along the upper surface of the guide plate 76. In this state, the drive roller 30 is in a still state (it may be rotated reversely to the sheet transport direction).

Next, the center leading edge of the sheet P in the width direction pushes up the registration detection lever 56, and the registration sensor 74 outputs the ON signal. The signal is received and the sheet P is transported until the leading edge of the sheet P runs against (collides with) the part (nip part) between the drive roller 30 and the pinch roller 31, and after the leading edge of the sheet P is aligned to become parallel to the main scanning direction at the nip part, driving of the transport motor 41 is started.

By this, the leading end of the sheet P is nipped between the pinch roller 31 and the drive roller 30, and the drive roller 30 and the downstream side drive roller 32 are intermittently driven in synchronization with each other.

Lines of nozzles (not shown) for jetting ink droplets are provided in the recording head 2 and in the sub-scanning direction, and the recording head 2 performs printing while moving in the predetermined print width and in the main scanning direction along the guide shafts 26*a* and 26*b*. The drive roller 30 and the drive roller 32 are stopped during the time when the recording head 2 moves in the main scanning direction and performs printing, and the movement of the recording head 2 and the driving of the drive roller 30 and the drive roller 32 are alternately performed, and accordingly, the driving of the drive roller 30 and the drive roller 32 is intermittently performed. By plural intermittent rotations, the transported sheet P is ejected to the front paper output tray 21 of the multifunction apparatus 1.

Incidentally, when an air suction unit (not shown) is connected to the platen 28, and the sheet P is sucked to the upper surface of the platen 28 during jetting of ink, there is obtained an effect that an interval between the sheet P and the nozzle surface of the recording head 2 can be held constant.

After a stage where the leading end of the sheet P is nipped between the downstream side transport roller pair 32, 33, although the transport speed by the downstream side transport roller pair 32, 33 is synchronized to be slightly faster than the transport speed by the transport upstream side roller pair 30, 31, since the nipping force of the downstream side transport roller pair 32, 33 is lower than the nipping force of the transport upstream side roller pair 30, 31, even if both the drive rollers 30 and 32 are driven in synchronization, the sheet P is slightly slipped at the nip part of the downstream side transport roller pair 32, 33, and the flatness of the sheet P on the platen 28 is held.

In the embodiment, it is also possible to dispose both the upstream side transmission gear 38 and the downstream side transmission gear 39 at the inner side of the side frame part 27*b*. In that case, an E-ring is fixed to the axial end side of the drive shaft 30*a* (32*a*), the coil spring 104 and the bearing body 36 (37) is disposed at its inward part, and positioning to a position where the drive shaft 30*a* (32*a*) is urged toward the left direction is performed.

Incidentally, as shown in FIG. 1, when the design is made such that the size of the main body case 4 in the horizontal direction at the front side (sheet ejection side) of the main body case 4 becomes small as it goes forward, the image forming apparatus appears to be compact. For that purpose, in the case where both the upstream side transmission gear 38 and the downstream side transmission gear 39 are disposed between the outer surface of the side frame part 27*b* and the inside of the side surface of the main body case 4, when the transmission gear 39 fixed to the end of the drive shaft 32 of the downstream side transport roller 32 is positioned nearer to the outer surface of the side frame part 27*b* than the transmission gear 38 fixed to the end of the drive shaft 30*a* of the upstream side transport roller 30 (see FIG. 14), it becomes possible to design the main body case 4 such that the side of the main body case 4 comes near the transmission gear 39.

Incidentally, in the embodiment, the output shaft to which the two pinion gears 42 and 42 simultaneously engaging with the two transmission gears 38 and 39 are attached may be a shaft of an intermediate gear provided at the transmission downstream side of the motor shaft of the transport motor 41, instead of the motor shaft 41*a*.

Besides, as the fitting groove 96 having the noncircular cross section in the bearing body 36 (37) in which the circumferential surface remains at least at the part, in the embodiment, the form (substantially oval type) is adopted in which part of the circumference at both sides of the center line are cut away, however, instead of this, a D-type fitting groove may be adopted in which part of the circumference at only one side is cut away.

As described above in detail, the recording medium transport device 3 according to this embodiment is one in which the pair of transport roller units for nipping and transporting a recording medium are disposed at the upstream side of the recording area and the downstream side thereof, and in which each of the upstream side transmission gear 90 attached to the drive shaft 30 in the upstream side transport roller unit, the downstream side transmission gear 90 attached to the drive shaft 32 in the downstream side transport roller unit, and the two drive pinion gears 42 attached to the one output shaft and engaging with both the transmission gears 90, 90 is the gear in which the two spur gears are integrally molded while their phases are shifted from each other by a half pitch.

As stated above, in each of the transmission gears 90 and the pinion gears 42, the two adjacent trains of the spur gears are shifted from each other by the half pitch, and therefore, as compared with a general spur gear, the contact ratio becomes twice, and the rotation movement of the transport motor can be certainly transmitted to both the upstream side and the downstream side transport roller units. Accordingly, the transport operation of the recording medium P can be suitably performed in accordance with the rotation movement of both the transport rollers, and the rotation movement is smoothly transmitted, so that the occurrence of noise of the whole transport system is little and a quiet operation can be realized. Further, since both the upstream side and the downstream side transport rollers 30, 32 are individually rotation-driven through the two drive pinion gears 42 attached to the one output shaft, as compared with the case where they are simultaneously driven by one drive pinion gear, secular change such as abrasion is small, and the quiet operation can be realized for a long period of time.

According to this embodiment, the integrally molded gear includes, between the two spur gears, an annular groove 91 including the junction surface of the two spur gears and having the specified width B1. Accordingly, even if there is a small error in the assembly of the pinion gears and the transmission gears and a small shift occurs between both the gears in the axial line direction, since the mating spur gear train does not engage with the spur gear train shifted by the half pitch, the quiet operation can be secured, and since strict accuracy is not required for the assembly of the transmission gears and the pinion gears, there is also an effect that the assembling operation becomes easy.

According to this embodiment, each of the drive shafts 30, 32 of the pair of transport roller units is supported rotatably and movably in the axial line by the bearing body 36, 37 mounted to the frame 27, each of the transmission gears 90, 90 fixed to the ends of the drive shafts 30, 32 is disposed outside or inside the frame 27, and the urging unit for elastically urging each of the drive shafts substantially in parallel to the axial line and in the direction in which the side end face of each of the transmission gears comes in contact with the side end face of each of the bearing bodies is provided. As stated above, in the state where each of the drive shafts is supported rotatably and movably along the axial line by the bearing body mounted to the frame, when it is urged by the urging unit so that the side end face of each of the transmission gears comes in contact with the side end face of each of the bearing bodies, by merely strictly setting only the relation between the side end face of each of the transmission gears and the reference position of the drive shaft, the shift of each of the transmission gears in the axial direction with respect to the pinion gears of the two series trains can be eliminated, and the assembling operation of the recording medium transport device becomes further easy.

According to this embodiment, the respective bearing bodies 36, 37 and the one output shaft are mounted to the same side frame. Accordingly, in addition to the above-described effects, for example, as compared with the case where each of the bearing bodies 36, 37 and the one output shaft are attached to different frames, there is an effect that relative position accuracy of the respective gears can be easily raised.

According to this embodiment, the urging unit includes the compression coil spring 104 disposed between the stopper body provided at the drive shaft and the bearing body, and the end of the compression coil spring 104 at the side where it comes in contact with the bearing body is subjected to the processing of reducing the friction load. Accordingly, there is an effect that each of the drive shafts can be smoothly rotation-driven while being suitably elastically urged in the axial direction.

According to this embodiment, the outer peripheral surface of the tube part 92 of each of the bearing bodies 36, 37 has the fitting groove with the noncircular cross section having at least part of the circumferential surface, the frame includes the large diameter part in which the fitting groove is rotatably fitted, and the insertion groove which communicates with the large diameter part from the end face of the frame and through which only the small diameter part of the fitting groove can pass, and each of the bearing bodies 36, 37 includes the integrally formed lever part 97 which can be rotated along the side of the frame. Accordingly, in the bearing body, only at the time of the phase when the small diameter part is matched with the insertion groove, the bearing body 36, 37 can be mounted to the frame, and at the other phase, the bearing body does not come off from the frame carelessly. Further, since the lever is formed integrally with each of the bearing bodies, it is possible to enable detachment and attachment by holding the lever part and by easily rotating the bearing body around the axial line, and there is obtained an effect that the assembling operation becomes easy.

According to this embodiment, in the image forming apparatus 1 including the recording medium transport device 3, when viewed on a plane, the pair of transport rollers 30, 32 and the platen facing the nozzle surface of the ink-jet recording head are disposed between the pair of right and left frames 27*b*, 27*c*, the respective transmission gears are disposed between the inside of the side of the main body case in the image forming apparatus and the outside of one of the frames, and the downstream side transmission gear 90 is disposed nearer to the side of the frame 27*b* than the upstream side transmission gear 90. Accordingly, the assembly of the transmission gears is easy, and among the sides of the main body case of the image forming apparatus, the horizontal width size of the main body case at the paper ejection side can be designed to be small, and the compact image forming apparatus can be provided.

What is claimed is:

1. A recording medium transport device comprising:

a pair of transport roller units which nip and transport a recording medium and which are disposed at an upstream side and a downstream side of a recording area respectively, the transport roller unit in the upstream side including a drive shaft and an upstream side transmission gear attached to the drive shaft, the transport roller unit in the downstream side including a drive shaft and a downstream side transmission gear attached to the drive shaft;

an output shaft; and a drive pinion gear attached to the output shaft and engaging with at least one of the transmission gears;

wherein each of the upstream side transmission gear, downstream side transmission gear and the drive pinion gear is a gear in which two spur gears are integrally formed while phases of the two spur gears are shifted from each other by a half pitch.

2. The recording medium transport device according to claim 1, wherein the integrally formed gear includes, between the two spur gears, an annular groove having a specified width.

3. The recording medium transport device according to claim 1, wherein each of the drive shafts of the pair of transport roller units is supported rotatably and movably in an axial line by a bearing body mounted to a frame;

each of the transmission gears fixed to ends of the drive shafts is disposed outside or inside the frame; and an urging unit for elastically urging each of the drive shafts substantially in parallel to the axial line and in a direction in which a side end face of each of the transmission gears comes in contact with a side end face of each of the bearing bodies is provided.

4. The recording medium transport device according to claim 3, wherein the respective bearing bodies and the output shaft are mounted to the frame on the same side.

5. The recording medium transport device according to claim 3, wherein the urging unit includes a compression coil spring disposed between a stopper body provided at the drive shaft and the bearing body, and an end of the compression coil spring at a side where it comes in contact with the bearing body is subjected to a processing of reducing a friction load.

6. The recording medium transport device according to claim 3, wherein an outer peripheral surface of a tube part of each of the bearing bodies has a fitting groove with a noncircular cross section having at least part of a circumferential surface;

the frame includes a large diameter part in which the fitting groove is rotatably fitted, and an insertion groove which communicates with the large diameter part from an end face of the frame and through which only a small diameter part of the fitting groove can pass; and each of the bearing bodies includes an integrally formed lever part which can be rotated along a side of the frame.

7. The recording medium transport device according to claim 1, the drive pinion gear comprises two drive pinion gears, and each of the drive pinion gears engages with a corresponding one of the upstream side transmission gear and the downstream side transmission gear.

8. An image forming apparatus comprising:

a main body case;

a recording medium transport device disposed in the main body case;

a pair of right and left frames; and a platen facing a nozzle surface of an ink-jet recording head;

wherein the recording medium transport device comprises:

a pair of transport roller units which nip and transport a recording medium and which are disposed at an upstream side and a downstream side of a recording area respectively, the transport roller unit in the upstream side including a drive shaft and an upstream side transmission gear attached to the drive shaft, the transport roller unit in the downstream side including a drive shaft and a downstream side transmission gear attached to the drive shaft;

an output shaft; and a drive pinion gear attached to the output shaft and engaging with at least one of the transmission gears;

wherein each of the upstream side transmission gear, downstream side transmission gear and the drive pinion gear is a gear in which two spur gears are integrally formed while phases of the two spur gears are shifted from each other by a half pitch; and wherein when viewed on a plane, the pair of transport roller units and the platen are disposed between the pair of right and left frames, the respective transmission gears are disposed between an inside of a side of the main body case and an outside of one of the frames, and the downstream side transmission gear is disposed nearer to the side of the right frame than the upstream side transmission gear.

9. An image forming apparatus comprising:

a frame including a side frame part;

a first transport roller unit including a first drive shaft and nipping and transporting a recording medium to a recording area;

a second transport roller unit including a second drive shaft and disposed at a downstream side of the recording area in a recording medium transport direction;

a first bearing body mounted to the side frame part, the first bearing body rotatably supporting the first drive shaft;

a second bearing body mounted to the side frame part, the second bearing body rotatably supporting the second drive shaft;

a first transmission gear attached to an end of the first drive shaft projecting from the side frame part and the first bearing body, the first transmission gear including two spur gears integrally formed while phases of the two spur gears are shifted from each other by a half pitch and an annular groove formed between the two spur gears;

a second transmission gear attached to an end of the second drive shaft projecting from the side frame part and the second bearing body, the second transmission gear including two spur gears integrally formed while phases of the two spur gears are shifted from each other by a half pitch and an annular groove formed between the two spur gears;

an output shaft; and a drive pinion gear attached to the output shaft and engaging with at least one of the first and second transmission gears, the drive pinion gear including two spur gears integrally formed while phases of the two spur gears are shifted from each other by a half pitch and an annular groove formed between the two spur gears.

10. The image forming apparatus according to claim 9, wherein the first bearing body and the second bearing body are made of a resin and each of which is formed with a pair of flange portion for sandwiching the side frame part.

* * * * *